US009439367B2

(12) United States Patent
Abhyanker

(10) Patent No.: US 9,439,367 B2
(45) Date of Patent: Sep. 13, 2016

(54) NETWORK ENABLED GARDENING WITH A REMOTELY CONTROLLABLE POSITIONING EXTENSION

(71) Applicant: Arthi Abhyanker, Cupertino, CA (US)

(72) Inventor: Arthi Abhyanker, Cupertino, CA (US)

(*) Notice: Subject to any disclaimer, the term of this patent is extended or adjusted under 35 U.S.C. 154(b) by 356 days.

(21) Appl. No.: 14/174,861

(22) Filed: Feb. 7, 2014

(65) Prior Publication Data
US 2015/0223415 A1 Aug. 13, 2015

(51) Int. Cl.
G05D 7/00 (2006.01)
G05D 11/00 (2006.01)
A01G 25/09 (2006.01)
A01G 25/16 (2006.01)
G05D 1/00 (2006.01)

(52) U.S. Cl.
CPC ............ A01G 25/09 (2013.01); A01G 25/16 (2013.01); G05D 1/0038 (2013.01); G05D 2201/0201 (2013.01)

(58) Field of Classification Search
None
See application file for complete search history.

(56) References Cited

U.S. PATENT DOCUMENTS

| 2,035,218 | A | 3/1936 | Bloom |
| 3,253,806 | A | 5/1966 | Eickmann |
| 3,556,438 | A | 1/1971 | Meditz |
| 3,762,669 | A | 10/1973 | Curci |
| 4,119,163 | A | 10/1978 | Ball |
| 4,161,843 | A | 7/1979 | Hui |
| 4,375,354 | A | 3/1983 | Henriksson |
| 4,556,198 | A | 12/1985 | Tominaga |
| 4,779,203 | A | 10/1988 | McClure et al. |
| 4,914,605 | A | 4/1990 | Loughmiller, Jr. et al. |

(Continued)

FOREIGN PATENT DOCUMENTS

| EP | 1426876 A1 | 6/2004 |
| KR | 101069834 B1 | 10/2010 |

(Continued)

OTHER PUBLICATIONS

"Crowdsourcing: Those that are willing to test & learn will be those that will win", Newsline, Mar. 1, 2011 by Neil Perkin http://mediatel.co.uk/newsline/2011/03/01/crowdsourcing-those-that-are-willing-to-test-learn-will-be-those-that-will-win/.

(Continued)

Primary Examiner — Diem Cao
(74) Attorney, Agent, or Firm — Raj Abhyanker, P.C.

(57) ABSTRACT

A watering apparatus and associated methods and systems to enable networked gardening with a remotely controllable positioning extension are disclosed. In one embodiment, the watering apparatus includes a weather-resistant housing to encompass a micro-processor and a communications circuitry. In addition, the watering apparatus includes a weather-resistant camera communicatively coupled with the weather resistant housing through the communications circuitry. An input connector directs water through a partitioned channel from the weather-resistant housing responsive to a signal from the microprocessor through a pressure regulated valve. The watering apparatus is connected to a flexible extension coupled with the weather-resistant housing to automatically transport the water through the partitioned channel to a desired location within a central view of a focused angle of the weather-resistant camera. Further, the watering apparatus may be accessed through a mobile device through a network based on an access control policy configured by a user of the watering apparatus.

11 Claims, 8 Drawing Sheets

(56) References Cited

U.S. PATENT DOCUMENTS

| | | |
|---|---|---|
| 4,996,468 A | 2/1991 | Field et al. |
| 5,032,989 A | 7/1991 | Tornetta |
| 5,050,844 A | 9/1991 | Hawk |
| 5,199,686 A | 4/1993 | Fletcher |
| 5,208,750 A | 5/1993 | Kurami et al. |
| 5,325,294 A | 6/1994 | Keene |
| 5,372,211 A | 12/1994 | Wilcox et al. |
| 5,521,817 A | 5/1996 | Burdoin et al. |
| 5,577,567 A | 11/1996 | Johnson et al. |
| 5,581,630 A | 12/1996 | Bonneau, Jr. |
| 5,584,025 A | 12/1996 | Keithley et al. |
| 5,590,062 A | 12/1996 | Nagamitsu et al. |
| 5,617,319 A | 4/1997 | Arakawa et al. |
| 5,630,103 A | 5/1997 | Smith et al. |
| 5,671,342 A | 9/1997 | Millier et al. |
| 5,720,363 A | 2/1998 | Kipp |
| 5,751,245 A | 5/1998 | Janky et al. |
| 5,774,133 A | 6/1998 | Neave et al. |
| 5,794,207 A | 8/1998 | Walker et al. |
| 5,805,810 A | 9/1998 | Maxwell |
| 5,819,269 A | 10/1998 | Uomini |
| 5,826,244 A | 10/1998 | Huberman |
| 5,831,664 A | 11/1998 | Wharton et al. |
| 5,835,896 A | 11/1998 | Fisher et al. |
| 5,852,810 A | 12/1998 | Sotiroff et al. |
| 5,904,214 A | 5/1999 | Lin |
| 5,905,499 A | 5/1999 | McDowall et al. |
| 5,907,322 A | 5/1999 | Kelly et al. |
| 5,926,765 A | 7/1999 | Sasaki |
| 5,930,474 A | 7/1999 | Dunworth et al. |
| 5,937,413 A | 8/1999 | Hyun et al. |
| 5,940,806 A | 8/1999 | Danial |
| 5,991,737 A | 11/1999 | Chen |
| 6,024,288 A | 2/2000 | Gottlich et al. |
| 6,029,141 A | 2/2000 | Bezos et al. |
| 6,029,195 A | 2/2000 | Herz |
| 6,034,618 A | 3/2000 | Tatebayashi et al. |
| 6,036,601 A | 3/2000 | Heckel |
| 6,047,194 A | 4/2000 | Andersson |
| 6,047,236 A | 4/2000 | Hancock et al. |
| 6,049,778 A | 4/2000 | Walker et al. |
| 6,059,263 A | 5/2000 | Otema et al. |
| 6,073,138 A | 6/2000 | de l'Etraz et al. |
| 6,078,906 A | 6/2000 | Huberman |
| 6,088,702 A | 7/2000 | Plantz et al. |
| 6,092,076 A | 7/2000 | McDonough et al. |
| 6,092,105 A | 7/2000 | Goldman |
| 6,101,484 A | 8/2000 | Halbert et al. |
| 6,108,639 A | 8/2000 | Walker et al. |
| 6,122,592 A | 9/2000 | Arakawa et al. |
| 6,134,486 A | 10/2000 | Kanayama |
| 6,148,260 A | 11/2000 | Musk et al. |
| 6,148,289 A | 11/2000 | Virdy |
| 6,175,831 B1 | 1/2001 | Weinreich et al. |
| 6,199,076 B1 | 3/2001 | Logan et al. |
| 6,229,533 B1 | 5/2001 | Farmer et al. |
| 6,236,990 B1 | 5/2001 | Geller et al. |
| 6,269,369 B1 | 7/2001 | Robertson |
| 6,308,177 B1 | 10/2001 | Israni et al. |
| 6,317,718 B1 | 11/2001 | Fano |
| 6,336,111 B1 | 1/2002 | Ashby et al. |
| 6,339,745 B1 | 1/2002 | Novik |
| 6,356,834 B2 | 3/2002 | Hancock et al. |
| 6,381,537 B1 | 4/2002 | Chenault et al. |
| 6,401,085 B1 | 6/2002 | Gershman et al. |
| 6,405,123 B1 | 6/2002 | Rennard et al. |
| 6,408,307 B1 | 6/2002 | Semple et al. |
| 6,445,983 B1 | 9/2002 | Dickson et al. |
| 6,453,339 B1 | 9/2002 | Schultz et al. |
| 6,470,268 B1 | 10/2002 | Ashcraft et al. |
| 6,480,885 B1 | 11/2002 | Olivier |
| 6,487,583 B1 | 11/2002 | Harvey et al. |
| 6,498,982 B2 | 12/2002 | Bellesfield et al. |
| 6,507,776 B1 | 1/2003 | Fox, III |
| 6,513,069 B1 | 1/2003 | Abato et al. |
| 6,519,629 B2 | 2/2003 | Harvey et al. |
| 6,532,007 B1 | 3/2003 | Matsuda |
| 6,542,813 B1 | 4/2003 | Kovacs |
| 6,542,817 B2 | 4/2003 | Miyaki |
| 6,542,936 B1 | 4/2003 | Mayle et al. |
| 6,557,013 B1 | 4/2003 | Ziff et al. |
| 6,587,787 B1 | 7/2003 | Yokota |
| 6,597,983 B2 | 7/2003 | Hancock |
| 6,600,418 B2 | 7/2003 | Francis et al. |
| 6,611,751 B2 | 8/2003 | Warren |
| 6,615,039 B1 | 9/2003 | Eldering |
| 6,622,086 B2 | 9/2003 | Polidi |
| 6,629,136 B1 | 9/2003 | Naidoo |
| 6,633,311 B1 | 10/2003 | Douvikas et al. |
| 6,636,803 B1 | 10/2003 | Hartz, Jr. et al. |
| 6,640,187 B1 | 10/2003 | Chenault et al. |
| 6,643,663 B1 | 11/2003 | Dabney et al. |
| 6,646,568 B2 | 11/2003 | MacPhail et al. |
| 6,647,383 B1 | 11/2003 | August et al. |
| 6,654,800 B1 | 11/2003 | Rieger, III |
| 6,658,410 B1 | 12/2003 | Sakamaki et al. |
| 6,662,016 B1 | 12/2003 | Buckham et al. |
| 6,672,601 B1 | 1/2004 | Hofheins et al. |
| 6,677,894 B2 | 1/2004 | Sheynblat et al. |
| 6,684,196 B1 | 1/2004 | Mini et al. |
| 6,687,878 B1 | 2/2004 | Eintracht et al. |
| 6,691,105 B1 | 2/2004 | Virdy |
| 6,691,114 B1 | 2/2004 | Nakamura |
| 6,711,414 B1 | 3/2004 | Lightman et al. |
| 6,716,101 B1 | 4/2004 | Meadows et al. |
| 6,719,570 B2 | 4/2004 | Tsuchioka |
| 6,721,748 B1 | 4/2004 | Knight et al. |
| 6,728,635 B2 | 4/2004 | Hamada et al. |
| 6,745,196 B1 | 6/2004 | Colyer et al. |
| 6,750,881 B1 | 6/2004 | Appelman |
| 6,798,407 B1 | 9/2004 | Benman |
| 6,816,850 B2 | 11/2004 | Culliss |
| 6,819,267 B1 | 11/2004 | Edmark et al. |
| 6,834,229 B2 | 12/2004 | Rafiah et al. |
| 6,847,823 B2 | 1/2005 | Lehikoinen et al. |
| 6,871,140 B1 | 3/2005 | Florance et al. |
| 6,882,307 B1 | 4/2005 | Gifford |
| 6,883,748 B2 | 4/2005 | Yoeli |
| 6,889,213 B1 | 5/2005 | Douvikas et al. |
| 6,907,405 B2 | 6/2005 | Brett |
| 6,918,576 B2 | 7/2005 | Finkbeiner |
| 6,926,233 B1 | 8/2005 | Corcoran, III |
| 6,931,419 B1 | 8/2005 | Lindquist |
| 6,950,791 B1 | 9/2005 | Bray et al. |
| 6,963,879 B2 | 11/2005 | Colver et al. |
| 6,968,179 B1 | 11/2005 | De Vries |
| 6,968,513 B1 | 11/2005 | Rinebold et al. |
| 6,974,123 B2 | 12/2005 | Latvys |
| 6,976,031 B1 | 12/2005 | Toupal et al. |
| 6,978,284 B2 | 12/2005 | McBrearty et al. |
| 6,983,139 B2 | 1/2006 | Dowling et al. |
| 6,987,976 B1 | 1/2006 | Kohar et al. |
| 7,006,881 B1 | 2/2006 | Hoffberg et al. |
| 7,013,292 B1 | 3/2006 | Hsu et al. |
| 7,024,397 B1 | 4/2006 | Donahue |
| 7,024,455 B2 | 4/2006 | Yokobori et al. |
| 7,038,681 B2 | 5/2006 | Scott et al. |
| 7,047,202 B2 | 5/2006 | Jaipuria et al. |
| 7,050,909 B2 | 5/2006 | Nichols et al. |
| 7,068,309 B2 | 6/2006 | Toyama et al. |
| 7,069,308 B2 | 6/2006 | Abrams |
| 7,072,849 B1 | 7/2006 | Filepp et al. |
| 7,076,409 B2 | 7/2006 | Agrawala et al. |
| 7,076,741 B2 | 7/2006 | Miyaki |
| 7,079,943 B2 | 7/2006 | Flann et al. |
| 7,080,019 B1 | 7/2006 | Hurzeler |
| 7,080,096 B1 | 7/2006 | Imamura |
| 7,085,650 B2 | 8/2006 | Anderson |
| 7,099,745 B2 | 8/2006 | Ebert |
| 7,099,862 B2 | 8/2006 | Fitzpatrick et al. |
| 7,117,254 B2 | 10/2006 | Lunt et al. |
| 7,130,702 B2 | 10/2006 | Morrell |
| 7,136,915 B2 | 11/2006 | Rieger, III |
| 7,155,336 B2 | 12/2006 | Dorfman et al. |

(56) References Cited

U.S. PATENT DOCUMENTS

| | | |
|---|---|---|
| 7,158,878 B2 | 1/2007 | Rasmussen et al. |
| 7,174,301 B2 | 2/2007 | Florance et al. |
| 7,177,872 B2 | 2/2007 | Schwesig et al. |
| 7,178,720 B1 | 2/2007 | Strubbe et al. |
| 7,184,990 B2 | 2/2007 | Walker et al. |
| 7,188,056 B2 | 3/2007 | Kagarlis |
| 7,188,080 B1 | 3/2007 | Walker et al. |
| 7,188,153 B2 | 3/2007 | Lunt et al. |
| 7,209,803 B2 | 4/2007 | Okamoto et al. |
| 7,218,993 B2 | 5/2007 | Yasukawa et al. |
| 7,228,232 B2 | 6/2007 | Bodin et al. |
| 7,233,942 B2 | 6/2007 | Nye |
| 7,249,123 B2 | 7/2007 | Elder et al. |
| 7,249,732 B2 | 7/2007 | Sanders, Jr. et al. |
| 7,251,647 B2 | 7/2007 | Hoblit |
| 7,254,559 B2 | 8/2007 | Florance et al. |
| 7,269,590 B2 | 9/2007 | Hull et al. |
| 7,293,019 B2 | 11/2007 | Dumais et al. |
| 7,296,026 B2 | 11/2007 | Patrick et al. |
| 7,306,186 B2 | 12/2007 | Kusic |
| 7,324,810 B2 | 1/2008 | Nave et al. |
| 7,343,564 B2 | 3/2008 | Othmer |
| 7,353,034 B2 | 4/2008 | Haney |
| 7,353,114 B1 | 4/2008 | Rohlf et al. |
| 7,353,199 B1 | 4/2008 | DiStefano, III |
| 7,359,871 B1 | 4/2008 | Paasche et al. |
| 7,359,894 B1 | 4/2008 | Liebman et al. |
| 7,373,244 B2 | 5/2008 | Kreft |
| 7,375,618 B2 | 5/2008 | Quintos |
| 7,383,251 B2 | 6/2008 | Might |
| 7,386,542 B2 | 6/2008 | Maybury et al. |
| 7,389,210 B2 | 6/2008 | Kagarlis |
| 7,424,438 B2 | 9/2008 | Vianello |
| 7,424,541 B2 | 9/2008 | Bourne |
| 7,426,970 B2 | 9/2008 | Olsen |
| 7,433,832 B1 | 10/2008 | Bezos et al. |
| 7,433,868 B1 | 10/2008 | Satomi et al. |
| 7,437,368 B1 | 10/2008 | Kolluri et al. |
| 7,441,031 B2 | 10/2008 | Shrinivasan et al. |
| 7,444,241 B2 | 10/2008 | Grimm |
| 7,447,509 B2 | 11/2008 | Cossins et al. |
| 7,447,685 B2 | 11/2008 | Nye |
| 7,447,771 B1 | 11/2008 | Taylor |
| 7,454,524 B2 | 11/2008 | Jeong |
| 7,475,953 B2 | 1/2009 | Osborn et al. |
| 7,477,285 B1 | 1/2009 | Johnson |
| 7,478,324 B1 | 1/2009 | Ohtsu |
| 7,480,867 B1 | 1/2009 | Racine et al. |
| 7,483,960 B2 | 1/2009 | Kyusojin |
| 7,487,114 B2 | 2/2009 | Florance et al. |
| 7,496,603 B2 | 2/2009 | Deguchi et al. |
| 7,500,258 B1 | 3/2009 | Eldering |
| 7,505,919 B2 | 3/2009 | Richardson |
| 7,505,929 B2 | 3/2009 | Angert et al. |
| 7,520,466 B2 | 4/2009 | Bostan |
| 7,525,276 B2 | 4/2009 | Eaton |
| 7,561,169 B2 | 7/2009 | Carroll |
| 7,562,023 B2 | 7/2009 | Yamamoto |
| 7,580,862 B1 | 8/2009 | Montelo et al. |
| 7,581,702 B2 | 9/2009 | Olson et al. |
| 7,587,276 B2 | 9/2009 | Gold et al. |
| 7,596,429 B2 * | 9/2009 | Cardinal .......... A01G 25/167 239/64 |
| 7,596,511 B2 | 9/2009 | Hall et al. |
| 7,599,795 B1 | 10/2009 | Blumberg et al. |
| 7,599,935 B2 | 10/2009 | La Rotonda et al. |
| 7,617,048 B2 | 11/2009 | Simon et al. |
| 7,636,687 B2 | 12/2009 | Foster et al. |
| 7,640,204 B2 | 12/2009 | Florance et al. |
| 7,658,346 B2 | 2/2010 | Goossen |
| 7,668,405 B2 | 2/2010 | Gallagher |
| 7,669,123 B2 | 2/2010 | Zuckerberg et al. |
| 7,680,673 B2 | 3/2010 | Wheeler |
| 7,680,859 B2 | 3/2010 | Schiller |
| 7,693,953 B2 | 4/2010 | Middleton et al. |
| 7,702,545 B1 | 4/2010 | Compton et al. |
| 7,725,492 B2 | 5/2010 | Sittig et al. |
| 7,734,254 B2 | 6/2010 | Frost et al. |
| 7,751,971 B2 | 7/2010 | Chang et al. |
| 7,761,789 B2 | 7/2010 | Erol et al. |
| 7,792,815 B2 | 9/2010 | Aravamudan et al. |
| 7,797,256 B2 | 9/2010 | Zuckerberg et al. |
| 7,801,542 B1 | 9/2010 | Stewart |
| 7,802,290 B1 | 9/2010 | Bansal et al. |
| 7,808,378 B2 | 10/2010 | Hayden |
| 7,809,709 B1 | 10/2010 | Harrison, Jr. |
| 7,809,805 B2 | 10/2010 | Stremel et al. |
| 7,810,037 B1 | 10/2010 | Edwards et al. |
| 7,812,717 B1 | 10/2010 | Cona et al. |
| 7,823,073 B2 | 10/2010 | Holmes et al. |
| 7,827,052 B2 | 11/2010 | Scott et al. |
| 7,827,120 B1 | 11/2010 | Evans et al. |
| 7,827,208 B2 | 11/2010 | Bosworth et al. |
| 7,827,265 B2 | 11/2010 | Cheever et al. |
| 7,831,917 B1 | 11/2010 | Karam |
| 7,840,224 B2 | 11/2010 | Vengroff et al. |
| 7,840,319 B2 | 11/2010 | Zhong |
| 7,840,558 B2 | 11/2010 | Wiseman et al. |
| 7,848,765 B2 | 12/2010 | Phillips et al. |
| 7,853,518 B2 | 12/2010 | Cagan |
| 7,853,563 B2 | 12/2010 | Alvarado et al. |
| 7,860,889 B1 | 12/2010 | Martino et al. |
| 7,870,199 B2 | 1/2011 | Galli et al. |
| 7,873,471 B2 | 1/2011 | Gieseke |
| 7,881,864 B2 | 2/2011 | Smith |
| 7,886,024 B2 | 2/2011 | Kelly et al. |
| 7,894,933 B2 | 2/2011 | Mountz et al. |
| 7,894,939 B2 | 2/2011 | Zini et al. |
| 7,894,981 B2 | 2/2011 | Yamane et al. |
| 7,904,366 B2 | 3/2011 | Pogust |
| 7,913,179 B2 | 3/2011 | Sheha et al. |
| 7,933,808 B2 | 4/2011 | Garcia |
| 7,933,810 B2 | 4/2011 | Morgenstern |
| 7,945,653 B2 | 5/2011 | Zuckerberg et al. |
| 7,949,714 B1 | 5/2011 | Burnim |
| 7,958,011 B1 | 6/2011 | Cretney et al. |
| 7,961,986 B1 | 6/2011 | Jing et al. |
| 7,962,281 B2 | 6/2011 | Rasmussen et al. |
| 7,966,567 B2 | 6/2011 | Abhyanker |
| 7,969,606 B2 | 6/2011 | Chu |
| 7,970,657 B2 | 6/2011 | Morgenstern |
| 7,980,808 B2 | 7/2011 | Chilson et al. |
| 7,991,703 B1 | 8/2011 | Watkins |
| 7,996,109 B2 | 8/2011 | Zini et al. |
| 7,996,270 B2 | 8/2011 | Sundaresan |
| 8,010,230 B2 | 8/2011 | Zini et al. |
| 8,027,943 B2 | 9/2011 | Juan et al. |
| 8,028,470 B2 | 10/2011 | Anderson |
| 8,046,309 B2 | 10/2011 | Evans et al. |
| 8,051,089 B2 | 11/2011 | Gargi et al. |
| 8,060,389 B2 | 11/2011 | Johnson |
| 8,060,555 B2 | 11/2011 | Grayson et al. |
| 8,064,590 B2 | 11/2011 | Abhyanker |
| 8,065,291 B2 | 11/2011 | Knorr |
| 8,095,430 B2 | 1/2012 | Abhyanker |
| 8,103,734 B2 | 1/2012 | Galli et al. |
| 8,107,879 B2 | 1/2012 | Pering et al. |
| 8,108,077 B2 | 1/2012 | Smith et al. |
| 8,108,501 B2 | 1/2012 | Birnie et al. |
| 8,112,419 B2 | 2/2012 | Hancock et al. |
| 8,117,486 B2 | 2/2012 | Handley |
| 8,136,145 B2 | 3/2012 | Fetterman et al. |
| 8,139,514 B2 | 3/2012 | Weber et al. |
| 8,145,661 B1 | 3/2012 | Billman et al. |
| 8,145,703 B2 | 3/2012 | Frishert et al. |
| 8,149,113 B2 | 4/2012 | Diem |
| 8,150,554 B2 | 4/2012 | Anderson |
| 8,167,234 B1 | 5/2012 | Moore |
| 8,171,128 B2 | 5/2012 | Zuckerberg et al. |
| 8,190,357 B2 | 5/2012 | Abhyanker et al. |
| 8,190,476 B2 | 5/2012 | Urbanski et al. |
| 8,195,601 B2 | 6/2012 | Law et al. |
| 8,195,744 B2 | 6/2012 | Julia et al. |
| 8,204,624 B2 | 6/2012 | Zini et al. |

(56) References Cited

U.S. PATENT DOCUMENTS

| | | |
|---|---|---|
| 8,204,776 B2 | 6/2012 | Abhyanker |
| 8,204,952 B2 | 6/2012 | Stremel et al. |
| 8,223,012 B1 | 7/2012 | Diem |
| 8,225,376 B2 | 7/2012 | Zuckerberg et al. |
| 8,229,470 B1 | 7/2012 | Ranjan et al. |
| 8,249,943 B2 | 8/2012 | Zuckerberg et al. |
| 8,271,057 B2 | 9/2012 | Levine et al. |
| 8,275,546 B2 | 9/2012 | Xiao et al. |
| 8,290,943 B2 | 10/2012 | Carbone et al. |
| 8,292,215 B2 | 10/2012 | Olm et al. |
| 8,296,373 B2 | 10/2012 | Bosworth et al. |
| 8,301,743 B2 | 10/2012 | Curran et al. |
| 8,315,389 B2 | 11/2012 | Qiu et al. |
| 8,322,072 B2 * | 12/2012 | Anderson ............ A01G 25/09 47/48.5 |
| 8,326,091 B1 | 12/2012 | Jing et al. |
| 8,326,315 B2 | 12/2012 | Phillips et al. |
| 8,328,130 B2 | 12/2012 | Goossen |
| 8,352,183 B2 | 1/2013 | Thota et al. |
| 8,364,757 B2 | 1/2013 | Scott et al. |
| 8,370,003 B2 | 2/2013 | So et al. |
| 8,380,382 B2 | 2/2013 | Sung et al. |
| 8,380,638 B1 | 2/2013 | Watkins |
| 8,391,789 B2 | 3/2013 | Palin et al. |
| 8,391,909 B2 | 3/2013 | Stewart |
| 8,401,771 B2 | 3/2013 | Krumm et al. |
| 8,402,094 B2 | 3/2013 | Bosworth et al. |
| 8,402,372 B2 | 3/2013 | Gillespie et al. |
| 8,412,576 B2 | 4/2013 | Urbanski et al. |
| 8,412,675 B2 | 4/2013 | Alvarado et al. |
| 8,427,308 B1 | 4/2013 | Baron, Sr. et al. |
| 8,428,565 B2 | 4/2013 | Middleton et al. |
| 8,433,609 B2 | 4/2013 | Abhyanker |
| 8,433,650 B1 | 4/2013 | Thomas |
| 8,438,156 B2 | 5/2013 | Redstone et al. |
| 8,442,923 B2 | 5/2013 | Gross |
| 8,443,107 B2 | 5/2013 | Burdette et al. |
| 8,447,810 B2 | 5/2013 | Roumeliotis et al. |
| 8,463,295 B1 | 6/2013 | Caralis et al. |
| 8,463,764 B2 | 6/2013 | Fujioka et al. |
| 8,473,199 B2 | 6/2013 | Blumberg et al. |
| 8,493,849 B2 | 7/2013 | Fuste Vilella et al. |
| 8,504,284 B2 | 8/2013 | Brülle-Drews et al. |
| 8,504,512 B2 | 8/2013 | Herzog et al. |
| 8,510,268 B1 | 8/2013 | Laforge et al. |
| 8,521,656 B2 | 8/2013 | Zimberoff et al. |
| 8,538,458 B2 | 9/2013 | Haney |
| 8,543,143 B2 | 9/2013 | Chandra et al. |
| 8,543,323 B1 | 9/2013 | Gold et al. |
| 8,548,493 B2 | 10/2013 | Rieger, III |
| 8,554,770 B2 | 10/2013 | Purdy |
| 8,554,852 B2 | 10/2013 | Burnim |
| 8,560,515 B2 | 10/2013 | Kimchi et al. |
| 8,584,091 B2 | 11/2013 | Champion et al. |
| 8,589,330 B2 | 11/2013 | Petersen et al. |
| 8,594,715 B1 | 11/2013 | Stewart |
| 8,595,292 B2 | 11/2013 | Grayson et al. |
| 8,600,602 B1 | 12/2013 | McAndrew et al. |
| 8,606,415 B1 | 12/2013 | Woytowitz et al. |
| 8,615,565 B2 | 12/2013 | Randall |
| 8,620,532 B2 | 12/2013 | Curtis et al. |
| 8,620,827 B1 | 12/2013 | Watkins, III |
| 8,621,374 B2 | 12/2013 | Sheha et al. |
| 8,626,699 B2 | 1/2014 | Xie et al. |
| 8,627,506 B2 | 1/2014 | Vera et al. |
| 8,649,907 B2 | 2/2014 | Ersavas |
| 8,649,976 B2 | 2/2014 | Kreft |
| 8,650,103 B2 | 2/2014 | Wilf et al. |
| 8,655,873 B2 | 2/2014 | Mitchell et al. |
| 8,660,541 B1 | 2/2014 | Beresniewicz et al. |
| 8,660,897 B2 | 2/2014 | Abhyanker |
| 8,666,660 B2 | 3/2014 | Sartipi et al. |
| 8,671,095 B2 | 3/2014 | Gross |
| 8,671,106 B1 | 3/2014 | Lee et al. |
| 8,683,342 B2 | 3/2014 | Van Riel |
| 8,688,594 B2 | 4/2014 | Thomas et al. |
| 8,694,605 B1 | 4/2014 | Burrell et al. |
| 8,695,919 B2 | 4/2014 | Shachor et al. |
| 8,712,441 B2 | 4/2014 | Haney |
| 8,713,055 B2 | 4/2014 | Callahan et al. |
| 8,713,143 B2 | 4/2014 | Centola et al. |
| 8,718,910 B2 | 5/2014 | Guéziec |
| 8,723,679 B2 | 5/2014 | Whisenant |
| 8,732,091 B1 | 5/2014 | Abhyanker |
| 8,732,155 B2 | 5/2014 | Vegnaduzzo et al. |
| 8,732,219 B1 | 5/2014 | Ferries et al. |
| 8,732,846 B2 | 5/2014 | D'Angelo et al. |
| 8,738,545 B2 | 5/2014 | Abhyanker |
| 8,775,405 B2 | 7/2014 | Gross |
| D710,454 S | 8/2014 | Barajas et al. |
| 8,794,566 B2 | 8/2014 | Hutson |
| 8,799,253 B2 | 8/2014 | Valliani et al. |
| 8,825,226 B1 | 9/2014 | Worley, III et al. |
| 8,832,556 B2 | 9/2014 | Steinberg |
| 2001/0005829 A1 | 6/2001 | Raveis |
| 2001/0016795 A1 | 8/2001 | Bellinger |
| 2001/0020955 A1 | 9/2001 | Nakagawa et al. |
| 2001/0029426 A1 | 10/2001 | Hancock et al. |
| 2001/0029501 A1 | 10/2001 | Yokobori et al. |
| 2001/0036833 A1 | 11/2001 | Koshima et al. |
| 2001/0037721 A1 | 11/2001 | Hasegawa et al. |
| 2001/0042087 A1 | 11/2001 | Kephart et al. |
| 2001/0049616 A1 | 12/2001 | Khuzadi et al. |
| 2001/0049636 A1 | 12/2001 | Hudda et al. |
| 2002/0019739 A1 | 2/2002 | Juneau et al. |
| 2002/0023018 A1 | 2/2002 | Kleinbaum |
| 2002/0026388 A1 | 2/2002 | Roebuck |
| 2002/0029350 A1 | 3/2002 | Cooper et al. |
| 2002/0030689 A1 | 3/2002 | Eichel et al. |
| 2002/0038225 A1 | 3/2002 | Klasky et al. |
| 2002/0046131 A1 | 4/2002 | Boone et al. |
| 2002/0046243 A1 | 4/2002 | Morris et al. |
| 2002/0049617 A1 | 4/2002 | Lencki et al. |
| 2002/0059201 A1 | 5/2002 | Work |
| 2002/0059379 A1 | 5/2002 | Harvey et al. |
| 2002/0065691 A1 | 5/2002 | Twig et al. |
| 2002/0065739 A1 | 5/2002 | Florance et al. |
| 2002/0070967 A1 | 6/2002 | Tanner et al. |
| 2002/0072848 A1 | 6/2002 | Hamada et al. |
| 2002/0077060 A1 | 6/2002 | Lehikoinen et al. |
| 2002/0077901 A1 | 6/2002 | Katz |
| 2002/0078171 A1 | 6/2002 | Schneider |
| 2002/0087260 A1 | 7/2002 | Hancock et al. |
| 2002/0087506 A1 | 7/2002 | Reddy |
| 2002/0090996 A1 | 7/2002 | Maehiro |
| 2002/0091556 A1 | 7/2002 | Fiala et al. |
| 2002/0097267 A1 | 7/2002 | Dinan et al. |
| 2002/0099693 A1 | 7/2002 | Kofsky |
| 2002/0103813 A1 | 8/2002 | Frigon |
| 2002/0103892 A1 | 8/2002 | Rieger |
| 2002/0124009 A1 | 9/2002 | Hoblit |
| 2002/0124053 A1 | 9/2002 | Adams et al. |
| 2002/0130906 A1 | 9/2002 | Miyaki |
| 2002/0133292 A1 | 9/2002 | Miyaki |
| 2002/0143462 A1 | 10/2002 | Warren |
| 2002/0147638 A1 | 10/2002 | Banerjee et al. |
| 2002/0156782 A1 | 10/2002 | Rubert |
| 2002/0156917 A1 | 10/2002 | Nye |
| 2002/0160762 A1 | 10/2002 | Nave et al. |
| 2002/0161666 A1 | 10/2002 | Fraki et al. |
| 2002/0169662 A1 | 11/2002 | Claiborne |
| 2002/0184496 A1 | 12/2002 | Mitchell et al. |
| 2002/0188522 A1 | 12/2002 | McCall et al. |
| 2003/0004802 A1 | 1/2003 | Callegari |
| 2003/0005035 A1 | 1/2003 | Rodgers |
| 2003/0018521 A1 | 1/2003 | Kraft et al. |
| 2003/0023489 A1 | 1/2003 | McGuire et al. |
| 2003/0023586 A1 | 1/2003 | Knorr |
| 2003/0033176 A1 | 2/2003 | Hancock |
| 2003/0036958 A1 | 2/2003 | Warmus et al. |
| 2003/0036963 A1 | 2/2003 | Jacobson et al. |
| 2003/0055983 A1 | 3/2003 | Callegari |
| 2003/0061503 A1 | 3/2003 | Katz et al. |
| 2003/0063072 A1 | 4/2003 | Brandenberg et al. |

(56) References Cited

U.S. PATENT DOCUMENTS

| | | |
|---|---|---|
| 2003/0064705 A1 | 4/2003 | Desiderio |
| 2003/0065716 A1 | 4/2003 | Kyusojin |
| 2003/0069002 A1 | 4/2003 | Hunter et al. |
| 2003/0069693 A1 | 4/2003 | Snapp et al. |
| 2003/0078897 A1 | 4/2003 | Florance et al. |
| 2003/0088520 A1 | 5/2003 | Bohrer et al. |
| 2003/0145093 A1 | 7/2003 | Oren et al. |
| 2003/0154020 A1 | 8/2003 | Polidi |
| 2003/0154213 A1 | 8/2003 | Ahn |
| 2003/0158668 A1 | 8/2003 | Anderson |
| 2003/0177019 A1 | 9/2003 | Santos et al. |
| 2003/0177192 A1 | 9/2003 | Umeki et al. |
| 2003/0182222 A1 | 9/2003 | Rotman et al. |
| 2003/0200192 A1 | 10/2003 | Bell et al. |
| 2003/0218253 A1 | 11/2003 | Avanzino et al. |
| 2003/0220807 A1 | 11/2003 | Hoffman et al. |
| 2003/0222918 A1 | 12/2003 | Coulthard |
| 2003/0225632 A1 | 12/2003 | Tong et al. |
| 2003/0225833 A1 | 12/2003 | Pilat et al. |
| 2004/0002871 A1 | 1/2004 | Geranio |
| 2004/0003283 A1 | 1/2004 | Goodman et al. |
| 2004/0021584 A1 | 2/2004 | Hartz et al. |
| 2004/0024846 A1 | 2/2004 | Randall et al. |
| 2004/0030525 A1 | 2/2004 | Robinson et al. |
| 2004/0030741 A1 | 2/2004 | Wolton et al. |
| 2004/0039581 A1 | 2/2004 | Wheeler |
| 2004/0054428 A1 | 3/2004 | Sheha et al. |
| 2004/0056762 A1 | 3/2004 | Rogers |
| 2004/0088177 A1 | 5/2004 | Travis et al. |
| 2004/0109012 A1 | 6/2004 | Kraus et al. |
| 2004/0111302 A1 | 6/2004 | Falk et al. |
| 2004/0122570 A1 | 6/2004 | Sonoyama et al. |
| 2004/0122693 A1 | 6/2004 | Hatscher et al. |
| 2004/0128215 A1 | 7/2004 | Florance et al. |
| 2004/0135805 A1 | 7/2004 | Gottsacker et al. |
| 2004/0139034 A1 | 7/2004 | Farmer |
| 2004/0139049 A1 | 7/2004 | Hancock et al. |
| 2004/0145593 A1 | 7/2004 | Berkner et al. |
| 2004/0146199 A1 | 7/2004 | Berkner et al. |
| 2004/0148275 A1 | 7/2004 | Achlioptas |
| 2004/0153466 A1 | 8/2004 | Ziff et al. |
| 2004/0157648 A1 | 8/2004 | Lightman |
| 2004/0158488 A1 | 8/2004 | Johnson |
| 2004/0162064 A1 | 8/2004 | Himmelstein |
| 2004/0166878 A1 | 8/2004 | Erskine et al. |
| 2004/0167787 A1 | 8/2004 | Lynch et al. |
| 2004/0172280 A1 | 9/2004 | Fraki et al. |
| 2004/0186766 A1 | 9/2004 | Fellenstein et al. |
| 2004/0210661 A1 | 10/2004 | Thompson |
| 2004/0215517 A1 | 10/2004 | Chen et al. |
| 2004/0215559 A1 | 10/2004 | Rebenack et al. |
| 2004/0217884 A1 | 11/2004 | Samadani et al. |
| 2004/0217980 A1 | 11/2004 | Radburn et al. |
| 2004/0220903 A1 | 11/2004 | Shah et al. |
| 2004/0220906 A1 | 11/2004 | Gargi et al. |
| 2004/0230562 A1 | 11/2004 | Wysoczanski et al. |
| 2004/0236771 A1 | 11/2004 | Colver et al. |
| 2004/0243478 A1 | 12/2004 | Walker et al. |
| 2004/0257340 A1 | 12/2004 | Jawerth |
| 2004/0260604 A1 | 12/2004 | Bedingfield |
| 2004/0260677 A1 | 12/2004 | Malpani et al. |
| 2004/0267625 A1 | 12/2004 | Feng et al. |
| 2005/0015488 A1 | 1/2005 | Bayyapu |
| 2005/0018177 A1 | 1/2005 | Rosenberg et al. |
| 2005/0021750 A1 | 1/2005 | Abrams |
| 2005/0027723 A1 | 2/2005 | Jones et al. |
| 2005/0034075 A1 | 2/2005 | Riegelman et al. |
| 2005/0044061 A1 | 2/2005 | Klemow |
| 2005/0049971 A1 | 3/2005 | Bettinger |
| 2005/0055353 A1 | 3/2005 | Marx et al. |
| 2005/0086309 A1 | 4/2005 | Galli et al. |
| 2005/0091027 A1 | 4/2005 | Zaher et al. |
| 2005/0091175 A9 | 4/2005 | Farmer |
| 2005/0091209 A1 | 4/2005 | Frank et al. |
| 2005/0094851 A1 | 5/2005 | Bodin et al. |
| 2005/0096977 A1 | 5/2005 | Rossides |
| 2005/0097319 A1 | 5/2005 | Zhu et al. |
| 2005/0108520 A1 | 5/2005 | Yamamoto et al. |
| 2005/0114527 A1 | 5/2005 | Hankey et al. |
| 2005/0114759 A1 | 5/2005 | Williams et al. |
| 2005/0114783 A1 | 5/2005 | Szeto |
| 2005/0120084 A1 | 6/2005 | Hu et al. |
| 2005/0131761 A1 | 6/2005 | Trika et al. |
| 2005/0137015 A1 | 6/2005 | Rogers et al. |
| 2005/0143174 A1 | 6/2005 | Goldman et al. |
| 2005/0144065 A1 | 6/2005 | Calabria et al. |
| 2005/0149432 A1 | 7/2005 | Galey |
| 2005/0154639 A1 | 7/2005 | Zetmeir |
| 2005/0159970 A1 | 7/2005 | Buyukkokten et al. |
| 2005/0171799 A1 | 8/2005 | Hull et al. |
| 2005/0171832 A1 | 8/2005 | Hull et al. |
| 2005/0171954 A1 | 8/2005 | Hull et al. |
| 2005/0171955 A1 | 8/2005 | Hull et al. |
| 2005/0177385 A1 | 8/2005 | Hull et al. |
| 2005/0187823 A1 | 8/2005 | Howes |
| 2005/0192859 A1 | 9/2005 | Mertins et al. |
| 2005/0192912 A1 | 9/2005 | Bator et al. |
| 2005/0192999 A1 | 9/2005 | Cook et al. |
| 2005/0193410 A1 | 9/2005 | Eldering |
| 2005/0197775 A1 | 9/2005 | Smith |
| 2005/0197846 A1 | 9/2005 | Pezaris et al. |
| 2005/0197950 A1 | 9/2005 | Moya et al. |
| 2005/0198020 A1 | 9/2005 | Garland et al. |
| 2005/0198031 A1 | 9/2005 | Pezaris et al. |
| 2005/0198305 A1 | 9/2005 | Pezaris et al. |
| 2005/0203768 A1 | 9/2005 | Florance et al. |
| 2005/0203769 A1 | 9/2005 | Weild |
| 2005/0203807 A1 | 9/2005 | Bezos et al. |
| 2005/0209776 A1 | 9/2005 | Ogino et al. |
| 2005/0209781 A1 | 9/2005 | Anderson |
| 2005/0216186 A1 | 9/2005 | Dorfman et al. |
| 2005/0216300 A1 | 9/2005 | Appelman et al. |
| 2005/0216550 A1 | 9/2005 | Paseman et al. |
| 2005/0219044 A1 | 10/2005 | Douglass et al. |
| 2005/0235062 A1 | 10/2005 | Lunt et al. |
| 2005/0240580 A1 | 10/2005 | Zamir et al. |
| 2005/0251331 A1 | 11/2005 | Kreft |
| 2005/0256756 A1 | 11/2005 | Lam et al. |
| 2005/0259648 A1 | 11/2005 | Kodialam et al. |
| 2005/0270299 A1 | 12/2005 | Rasmussen et al. |
| 2005/0273346 A1 | 12/2005 | Frost |
| 2005/0283497 A1 | 12/2005 | Nurminen et al. |
| 2005/0288957 A1 | 12/2005 | Eraker et al. |
| 2005/0288958 A1 | 12/2005 | Eraker et al. |
| 2005/0289650 A1 | 12/2005 | Kalogridis |
| 2006/0004680 A1 | 1/2006 | Robarts et al. |
| 2006/0004703 A1 | 1/2006 | Spivack et al. |
| 2006/0004734 A1 | 1/2006 | Malkin et al. |
| 2006/0022048 A1 | 2/2006 | Johnson |
| 2006/0023881 A1 | 2/2006 | Akiyama et al. |
| 2006/0025883 A1 | 2/2006 | Reeves |
| 2006/0026147 A1 | 2/2006 | Cone et al. |
| 2006/0036588 A1 | 2/2006 | Frank et al. |
| 2006/0036748 A1 | 2/2006 | Nusbaum et al. |
| 2006/0041543 A1 | 2/2006 | Achlioptas |
| 2006/0042483 A1 | 3/2006 | Work et al. |
| 2006/0047825 A1 | 3/2006 | Steenstra et al. |
| 2006/0048059 A1 | 3/2006 | Etkin |
| 2006/0052091 A1 | 3/2006 | Onyon et al. |
| 2006/0058921 A1 | 3/2006 | Okamoto |
| 2006/0058952 A1 | 3/2006 | Cooper et al. |
| 2006/0059023 A1 | 3/2006 | Mashinsky |
| 2006/0064431 A1 | 3/2006 | Kishore et al. |
| 2006/0074780 A1 | 4/2006 | Taylor et al. |
| 2006/0075335 A1 | 4/2006 | Gloor |
| 2006/0080613 A1 | 4/2006 | Savant |
| 2006/0085419 A1 | 4/2006 | Rosen |
| 2006/0088145 A1 | 4/2006 | Reed et al. |
| 2006/0089882 A1 | 4/2006 | Shimansky |
| 2006/0100892 A1 | 5/2006 | Ellanti |
| 2006/0113425 A1 | 6/2006 | Rader |
| 2006/0123053 A1 | 6/2006 | Scannell |
| 2006/0125616 A1 | 6/2006 | Song |
| 2006/0136127 A1 | 6/2006 | Coch et al. |

(56) References Cited

U.S. PATENT DOCUMENTS

| | | |
|---|---|---|
| 2006/0136419 A1 | 6/2006 | Brydon et al. |
| 2006/0143066 A1 | 6/2006 | Calabria |
| 2006/0143067 A1 | 6/2006 | Calabria |
| 2006/0143083 A1 | 6/2006 | Wedeen |
| 2006/0143183 A1 | 6/2006 | Goldberg et al. |
| 2006/0149624 A1 | 7/2006 | Baluja et al. |
| 2006/0161599 A1 | 7/2006 | Rosen |
| 2006/0178972 A1 | 8/2006 | Jung et al. |
| 2006/0184578 A1 | 8/2006 | La Rotonda et al. |
| 2006/0184617 A1 | 8/2006 | Nicholas et al. |
| 2006/0184997 A1 | 8/2006 | La Rotonda et al. |
| 2006/0190279 A1 | 8/2006 | Heflin |
| 2006/0190281 A1 | 8/2006 | Kott et al. |
| 2006/0194186 A1 | 8/2006 | Nanda |
| 2006/0200384 A1 | 9/2006 | Arutunian et al. |
| 2006/0212407 A1 | 9/2006 | Lyon |
| 2006/0217885 A1 | 9/2006 | Crady et al. |
| 2006/0218225 A1 | 9/2006 | Hee Voon et al. |
| 2006/0218226 A1 | 9/2006 | Johnson et al. |
| 2006/0223518 A1 | 10/2006 | Haney |
| 2006/0226281 A1 | 10/2006 | Walton |
| 2006/0229063 A1 | 10/2006 | Koch |
| 2006/0230061 A1 | 10/2006 | Sample et al. |
| 2006/0238383 A1 | 10/2006 | Kimchi et al. |
| 2006/0242139 A1 | 10/2006 | Butterfield et al. |
| 2006/0242178 A1 | 10/2006 | Butterfield et al. |
| 2006/0242581 A1 | 10/2006 | Manion et al. |
| 2006/0247940 A1 | 11/2006 | Zhu et al. |
| 2006/0248573 A1 | 11/2006 | Pannu et al. |
| 2006/0251292 A1 | 11/2006 | Gokturk et al. |
| 2006/0253491 A1 | 11/2006 | Gokturk et al. |
| 2006/0256008 A1 | 11/2006 | Rosenberg |
| 2006/0264209 A1 | 11/2006 | Atkinson et al. |
| 2006/0265277 A1 | 11/2006 | Yasinovsky et al. |
| 2006/0265417 A1 | 11/2006 | Amato et al. |
| 2006/0270419 A1 | 11/2006 | Crowley et al. |
| 2006/0270421 A1 | 11/2006 | Phillips et al. |
| 2006/0271287 A1 | 11/2006 | Gold et al. |
| 2006/0271472 A1 | 11/2006 | Cagan |
| 2006/0293976 A1 | 12/2006 | Nam |
| 2006/0294011 A1 | 12/2006 | Smith |
| 2007/0002057 A1 | 1/2007 | Danzig et al. |
| 2007/0003182 A1 | 1/2007 | Hunn |
| 2007/0005683 A1 | 1/2007 | Omidyar |
| 2007/0005750 A1 | 1/2007 | Lunt et al. |
| 2007/0011148 A1 | 1/2007 | Burkey et al. |
| 2007/0011617 A1 | 1/2007 | Akagawa et al. |
| 2007/0016689 A1 | 1/2007 | Birch |
| 2007/0027920 A1 | 2/2007 | Alvarado et al. |
| 2007/0032942 A1 | 2/2007 | Thota |
| 2007/0033064 A1 | 2/2007 | Abrahamsohn |
| 2007/0033182 A1 | 2/2007 | Knorr |
| 2007/0038646 A1 | 2/2007 | Thota |
| 2007/0043947 A1 | 2/2007 | Mizikovsky et al. |
| 2007/0050360 A1 | 3/2007 | Hull et al. |
| 2007/0061128 A1 | 3/2007 | Odom et al. |
| 2007/0061405 A1 | 3/2007 | Keohane et al. |
| 2007/0067219 A1 | 3/2007 | Altberg et al. |
| 2007/0078747 A1 | 4/2007 | Baack |
| 2007/0078772 A1 | 4/2007 | Dadd |
| 2007/0088462 A1 | 4/2007 | Peleg |
| 2007/0099609 A1 | 5/2007 | Cai |
| 2007/0105536 A1 | 5/2007 | Tingo |
| 2007/0106627 A1 | 5/2007 | Srivastava et al. |
| 2007/0112461 A1 | 5/2007 | Zini et al. |
| 2007/0112645 A1 | 5/2007 | Traynor et al. |
| 2007/0112729 A1 | 5/2007 | Wiseman et al. |
| 2007/0118430 A1 | 5/2007 | Wiseman et al. |
| 2007/0118525 A1 | 5/2007 | Svendsen |
| 2007/0150375 A1 | 6/2007 | Yang |
| 2007/0150603 A1 | 6/2007 | Crull et al. |
| 2007/0156429 A1 | 7/2007 | Godar |
| 2007/0159651 A1 | 7/2007 | Disario et al. |
| 2007/0162432 A1 | 7/2007 | Armstrong et al. |
| 2007/0162458 A1 | 7/2007 | Fasciano |
| 2007/0162547 A1 | 7/2007 | Ross |
| 2007/0162942 A1 | 7/2007 | Hamynen et al. |
| 2007/0167204 A1 | 7/2007 | Lyle et al. |
| 2007/0168852 A1 | 7/2007 | Erol et al. |
| 2007/0168888 A1 | 7/2007 | Jawerth |
| 2007/0174389 A1 | 7/2007 | Armstrong et al. |
| 2007/0179905 A1 | 8/2007 | Buch et al. |
| 2007/0185906 A1 | 8/2007 | Humphries et al. |
| 2007/0192299 A1 | 8/2007 | Zuckerberg et al. |
| 2007/0203644 A1 | 8/2007 | Thota et al. |
| 2007/0203820 A1 | 8/2007 | Rashid |
| 2007/0207755 A1 | 9/2007 | Julia et al. |
| 2007/0208613 A1 | 9/2007 | Backer |
| 2007/0208802 A1 | 9/2007 | Barman et al. |
| 2007/0208916 A1 | 9/2007 | Tomita |
| 2007/0214141 A1 | 9/2007 | Sittig et al. |
| 2007/0218900 A1 | 9/2007 | Abhyanker |
| 2007/0219659 A1 | 9/2007 | Abhyanker et al. |
| 2007/0219712 A1 | 9/2007 | Abhyanker |
| 2007/0220174 A1 | 9/2007 | Abhyanker |
| 2007/0226314 A1 | 9/2007 | Eick et al. |
| 2007/0233291 A1 | 10/2007 | Herde et al. |
| 2007/0233367 A1 | 10/2007 | Chen et al. |
| 2007/0233375 A1 | 10/2007 | Garg et al. |
| 2007/0233582 A1 | 10/2007 | Abhyanker |
| 2007/0239352 A1 | 10/2007 | Thota et al. |
| 2007/0239552 A1 | 10/2007 | Sundaresan |
| 2007/0239648 A1 | 10/2007 | Thota |
| 2007/0245002 A1 | 10/2007 | Nguyen et al. |
| 2007/0250321 A1 | 10/2007 | Balusu |
| 2007/0250511 A1 | 10/2007 | Endler et al. |
| 2007/0255785 A1 | 11/2007 | Hayashi et al. |
| 2007/0255831 A1 | 11/2007 | Hayashi et al. |
| 2007/0258642 A1 | 11/2007 | Thota |
| 2007/0259654 A1 | 11/2007 | Oijer |
| 2007/0260599 A1 | 11/2007 | McGuire et al. |
| 2007/0261071 A1 | 11/2007 | Lunt et al. |
| 2007/0266003 A1 | 11/2007 | Wong et al. |
| 2007/0266097 A1 | 11/2007 | Harik et al. |
| 2007/0266118 A1 | 11/2007 | Wilkins |
| 2007/0268310 A1 | 11/2007 | Dolph et al. |
| 2007/0270163 A1 | 11/2007 | Anupam et al. |
| 2007/0271367 A1 | 11/2007 | Yardeni et al. |
| 2007/0273558 A1 | 11/2007 | Smith et al. |
| 2007/0281689 A1 | 12/2007 | Altman et al. |
| 2007/0281690 A1 | 12/2007 | Altman et al. |
| 2007/0281716 A1 | 12/2007 | Altman et al. |
| 2007/0282621 A1 | 12/2007 | Altman et al. |
| 2007/0282987 A1 | 12/2007 | Fischer et al. |
| 2007/0288164 A1 | 12/2007 | Gordon et al. |
| 2007/0288311 A1 | 12/2007 | Underhill |
| 2007/0288621 A1 | 12/2007 | Gundu et al. |
| 2007/0294357 A1 | 12/2007 | Antoine |
| 2008/0005076 A1 | 1/2008 | Payne et al. |
| 2008/0005231 A1 | 1/2008 | Kelley et al. |
| 2008/0010343 A1 | 1/2008 | Escaffi et al. |
| 2008/0010365 A1 | 1/2008 | Schneider |
| 2008/0016051 A1 | 1/2008 | Schiller |
| 2008/0020814 A1 | 1/2008 | Kernene |
| 2008/0032666 A1 | 2/2008 | Hughes et al. |
| 2008/0032703 A1 | 2/2008 | Krumm et al. |
| 2008/0033641 A1 | 2/2008 | Medalia |
| 2008/0033652 A1 | 2/2008 | Hensley et al. |
| 2008/0033739 A1 | 2/2008 | Zuckerberg et al. |
| 2008/0033776 A1 | 2/2008 | Marchese |
| 2008/0040370 A1 | 2/2008 | Bosworth et al. |
| 2008/0040428 A1 | 2/2008 | Wei et al. |
| 2008/0040474 A1 | 2/2008 | Zuckerberg et al. |
| 2008/0040475 A1 | 2/2008 | Bosworth et al. |
| 2008/0040673 A1 | 2/2008 | Zuckerberg et al. |
| 2008/0043020 A1 | 2/2008 | Snow et al. |
| 2008/0043037 A1 | 2/2008 | Carroll |
| 2008/0046976 A1 | 2/2008 | Zuckerberg |
| 2008/0048065 A1 | 2/2008 | Kuntz |
| 2008/0051932 A1 | 2/2008 | Jermyn et al. |
| 2008/0059992 A1 | 3/2008 | Amidon et al. |
| 2008/0065321 A1 | 3/2008 | DaCosta |
| 2008/0065611 A1 | 3/2008 | Hepworth et al. |
| 2008/0070593 A1 | 3/2008 | Altman et al. |

(56) References Cited

U.S. PATENT DOCUMENTS

| | | |
|---|---|---|
| 2008/0070697 A1 | 3/2008 | Robinson et al. |
| 2008/0071929 A1 | 3/2008 | Motte et al. |
| 2008/0077464 A1 | 3/2008 | Gottlieb et al. |
| 2008/0077581 A1 | 3/2008 | Drayer et al. |
| 2008/0077642 A1 | 3/2008 | Carbone et al. |
| 2008/0077708 A1 | 3/2008 | Scott et al. |
| 2008/0086368 A1 | 4/2008 | Bauman et al. |
| 2008/0086458 A1 | 4/2008 | Robinson et al. |
| 2008/0091461 A1 | 4/2008 | Evans et al. |
| 2008/0091723 A1 | 4/2008 | Zuckerberg et al. |
| 2008/0091786 A1 | 4/2008 | Jhanji |
| 2008/0097999 A1 | 4/2008 | Horan |
| 2008/0098090 A1 | 4/2008 | Geraci et al. |
| 2008/0098313 A1 | 4/2008 | Pollack |
| 2008/0103959 A1 | 5/2008 | Carroll et al. |
| 2008/0104227 A1 | 5/2008 | Birnie et al. |
| 2008/0109718 A1 | 5/2008 | Narayanaswami |
| 2008/0115082 A1 | 5/2008 | Simmons et al. |
| 2008/0115226 A1 | 5/2008 | Welingkar et al. |
| 2008/0117928 A1 | 5/2008 | Abhyanker |
| 2008/0125969 A1 | 5/2008 | Chen et al. |
| 2008/0126355 A1 | 5/2008 | Rowley |
| 2008/0126411 A1 | 5/2008 | Zhuang et al. |
| 2008/0126476 A1 | 5/2008 | Nicholas et al. |
| 2008/0126478 A1 | 5/2008 | Ferguson et al. |
| 2008/0133495 A1 | 6/2008 | Fischer |
| 2008/0133649 A1 | 6/2008 | Pennington |
| 2008/0134035 A1 | 6/2008 | Pennington et al. |
| 2008/0148156 A1 | 6/2008 | Brewer et al. |
| 2008/0154733 A1 | 6/2008 | Wolfe |
| 2008/0155019 A1 | 6/2008 | Wallace et al. |
| 2008/0162027 A1 | 7/2008 | Murphy et al. |
| 2008/0162211 A1 | 7/2008 | Addington |
| 2008/0162260 A1 | 7/2008 | Rohan et al. |
| 2008/0167771 A1 | 7/2008 | Whittaker et al. |
| 2008/0168068 A1 | 7/2008 | Hutheesing |
| 2008/0168175 A1 | 7/2008 | Tran |
| 2008/0172173 A1 | 7/2008 | Chang et al. |
| 2008/0172244 A1 | 7/2008 | Coupal et al. |
| 2008/0172288 A1 | 7/2008 | Pilskalns et al. |
| 2008/0189292 A1 | 8/2008 | Stremel et al. |
| 2008/0189380 A1 | 8/2008 | Bosworth et al. |
| 2008/0189768 A1 | 8/2008 | Callahan et al. |
| 2008/0195483 A1 | 8/2008 | Moore |
| 2008/0201156 A1 | 8/2008 | Abhyanker |
| 2008/0208956 A1 | 8/2008 | Spiridellis et al. |
| 2008/0208969 A1 | 8/2008 | Van Riel |
| 2008/0215994 A1 | 9/2008 | Harrison et al. |
| 2008/0221846 A1 | 9/2008 | Aggarwal et al. |
| 2008/0221984 A1 | 9/2008 | Abhyanker |
| 2008/0222140 A1 | 9/2008 | Lagad et al. |
| 2008/0222308 A1 | 9/2008 | Abhyanker |
| 2008/0228719 A1 | 9/2008 | Abhyanker et al. |
| 2008/0228775 A1 | 9/2008 | Abhyanker et al. |
| 2008/0229424 A1 | 9/2008 | Harris et al. |
| 2008/0231630 A1 | 9/2008 | Shenkar et al. |
| 2008/0238941 A1 | 10/2008 | Kinnan et al. |
| 2008/0240397 A1 | 10/2008 | Abhyanker |
| 2008/0242317 A1 | 10/2008 | Abhyanker |
| 2008/0243378 A1 | 10/2008 | Zavoli |
| 2008/0243598 A1 | 10/2008 | Abhyanker |
| 2008/0243667 A1 | 10/2008 | Lecomte |
| 2008/0243830 A1 | 10/2008 | Abhyanker |
| 2008/0250025 A1 | 10/2008 | Abhyanker |
| 2008/0255759 A1 | 10/2008 | Abhyanker |
| 2008/0256230 A1 | 10/2008 | Handley |
| 2008/0263460 A1 | 10/2008 | Altberg et al. |
| 2008/0269992 A1 | 10/2008 | Kawasaki |
| 2008/0270158 A1 | 10/2008 | Abhyanker |
| 2008/0270366 A1 | 10/2008 | Frank |
| 2008/0270615 A1 | 10/2008 | Centola et al. |
| 2008/0270945 A1 | 10/2008 | Abhyanker |
| 2008/0281854 A1 | 11/2008 | Abhyanker |
| 2008/0288277 A1 | 11/2008 | Fasciano |
| 2008/0288612 A1 | 11/2008 | Kwon |
| 2008/0294678 A1 | 11/2008 | Gorman et al. |
| 2008/0294747 A1 | 11/2008 | Abhyanker |
| 2008/0300979 A1 | 12/2008 | Abhyanker |
| 2008/0301565 A1 | 12/2008 | Abhyanker |
| 2008/0306754 A1 | 12/2008 | Abhyanker |
| 2008/0307053 A1 | 12/2008 | Mitnick et al. |
| 2008/0307066 A1 | 12/2008 | Amidon et al. |
| 2008/0307320 A1 | 12/2008 | Payne et al. |
| 2008/0316021 A1 | 12/2008 | Manz et al. |
| 2008/0319778 A1 | 12/2008 | Abhyanker |
| 2008/0319806 A1 | 12/2008 | Abhyanker |
| 2009/0003265 A1 | 1/2009 | Agarwal et al. |
| 2009/0006177 A1 | 1/2009 | Beaver et al. |
| 2009/0006473 A1 | 1/2009 | Elliott et al. |
| 2009/0007195 A1 | 1/2009 | Beyabani |
| 2009/0018850 A1 | 1/2009 | Abhyanker |
| 2009/0018925 A1 | 1/2009 | Abhyanker |
| 2009/0019004 A1 | 1/2009 | Abhyanker |
| 2009/0019085 A1 | 1/2009 | Abhyanker |
| 2009/0019122 A1 | 1/2009 | Abhyanker |
| 2009/0019366 A1 | 1/2009 | Abhyanker |
| 2009/0019373 A1 | 1/2009 | Abhyanker |
| 2009/0024740 A1 | 1/2009 | Abhyanker |
| 2009/0029672 A1 | 1/2009 | Manz |
| 2009/0030927 A1 | 1/2009 | Cases et al. |
| 2009/0031006 A1 | 1/2009 | Johnson |
| 2009/0031245 A1 | 1/2009 | Brezina et al. |
| 2009/0031301 A1 | 1/2009 | D'Angelo et al. |
| 2009/0043650 A1 | 2/2009 | Abhyanker et al. |
| 2009/0044254 A1 | 2/2009 | Tian |
| 2009/0048922 A1 | 2/2009 | Morgenstern et al. |
| 2009/0049018 A1 | 2/2009 | Gross |
| 2009/0049037 A1 | 2/2009 | Gross |
| 2009/0049070 A1 | 2/2009 | Steinberg |
| 2009/0049127 A1 | 2/2009 | Juan et al. |
| 2009/0061883 A1 | 3/2009 | Abhyanker |
| 2009/0063252 A1 | 3/2009 | Abhyanker |
| 2009/0063467 A1 | 3/2009 | Abhyanker |
| 2009/0063500 A1 | 3/2009 | Zhai et al. |
| 2009/0064011 A1 | 3/2009 | Abhyanker |
| 2009/0064144 A1 | 3/2009 | Abhyanker |
| 2009/0069034 A1 | 3/2009 | Abhyanker |
| 2009/0070334 A1 | 3/2009 | Callahan et al. |
| 2009/0070435 A1 | 3/2009 | Abhyanker |
| 2009/0077100 A1 | 3/2009 | Hancock et al. |
| 2009/0099701 A1 | 4/2009 | Li et al. |
| 2009/0102644 A1 | 4/2009 | Hayden |
| 2009/0119275 A1 | 5/2009 | Chen et al. |
| 2009/0132504 A1 | 5/2009 | Vegnaduzzo et al. |
| 2009/0132644 A1 | 5/2009 | Frishert et al. |
| 2009/0171950 A1 | 7/2009 | Lunenfeld |
| 2009/0177577 A1 | 7/2009 | Garcia |
| 2009/0177628 A1 | 7/2009 | Yanagisawa et al. |
| 2009/0228305 A1 | 9/2009 | Gustafsson et al. |
| 2009/0254971 A1 | 10/2009 | Herz et al. |
| 2009/0271417 A1 | 10/2009 | Toebes et al. |
| 2009/0271524 A1 | 10/2009 | Davi et al. |
| 2009/0281672 A1 | 11/2009 | Pourzia |
| 2009/0282353 A1 | 11/2009 | Halbherr et al. |
| 2009/0284530 A1 | 11/2009 | Lester et al. |
| 2009/0287682 A1 | 11/2009 | Fujioka et al. |
| 2009/0299551 A1 | 12/2009 | So et al. |
| 2010/0011081 A1 | 1/2010 | Crowley et al. |
| 2010/0023388 A1 | 1/2010 | Blumberg et al. |
| 2010/0024045 A1 | 1/2010 | Sastry et al. |
| 2010/0051740 A1 | 3/2010 | Yoeli |
| 2010/0057555 A1 | 3/2010 | Butterfield et al. |
| 2010/0064007 A1 | 3/2010 | Randall |
| 2010/0070075 A1 | 3/2010 | Chirnomas |
| 2010/0076966 A1 | 3/2010 | Strutton et al. |
| 2010/0077316 A1 | 3/2010 | Omansky et al. |
| 2010/0079338 A1 | 4/2010 | Wooden et al. |
| 2010/0082683 A1 | 4/2010 | Law et al. |
| 2010/0083125 A1 | 4/2010 | Zafar et al. |
| 2010/0088015 A1 | 4/2010 | Lee |
| 2010/0094548 A1 | 4/2010 | Tadman et al. |
| 2010/0100937 A1 | 4/2010 | Tran |
| 2010/0106731 A1 | 4/2010 | Cartmell et al. |
| 2010/0108801 A1 | 5/2010 | Olm et al. |

(56) References Cited

U.S. PATENT DOCUMENTS

| | | |
|---|---|---|
| 2010/0118025 A1 | 5/2010 | Smith et al. |
| 2010/0120422 A1 | 5/2010 | Cheung et al. |
| 2010/0138259 A1 | 6/2010 | Delk |
| 2010/0138318 A1 | 6/2010 | Chun |
| 2010/0191798 A1 | 7/2010 | Seefeld et al. |
| 2010/0198684 A1 | 8/2010 | Eraker et al. |
| 2010/0214250 A1 | 8/2010 | Gillespie et al. |
| 2010/0231383 A1 | 9/2010 | Levine et al. |
| 2010/0243794 A1 | 9/2010 | Jermyn |
| 2010/0255899 A1 | 10/2010 | Paulsen |
| 2010/0275033 A1 | 10/2010 | Gillespie et al. |
| 2010/0306016 A1 | 12/2010 | Solaro et al. |
| 2011/0001020 A1 | 1/2011 | Forgac |
| 2011/0015954 A1 | 1/2011 | Ward |
| 2011/0022540 A1 | 1/2011 | Stern et al. |
| 2011/0040681 A1 | 2/2011 | Ahroon |
| 2011/0040692 A1 | 2/2011 | Ahroon |
| 2011/0041084 A1 | 2/2011 | Karam |
| 2011/0061018 A1 | 3/2011 | Piratla et al. |
| 2011/0066588 A1 | 3/2011 | Xie et al. |
| 2011/0066648 A1 | 3/2011 | Abhyanker et al. |
| 2011/0078012 A1 | 3/2011 | Adamec |
| 2011/0078270 A1 | 3/2011 | Galli et al. |
| 2011/0082747 A1 | 4/2011 | Khan et al. |
| 2011/0087667 A1 | 4/2011 | Hutheesing |
| 2011/0093340 A1 | 4/2011 | Kramer et al. |
| 2011/0093498 A1 | 4/2011 | Lunt et al. |
| 2011/0099142 A1 | 4/2011 | Karjalainen et al. |
| 2011/0106658 A1 | 5/2011 | Britt |
| 2011/0112976 A1 | 5/2011 | Ryan et al. |
| 2011/0128144 A1 | 6/2011 | Baron, Sr. et al. |
| 2011/0131172 A1 | 6/2011 | Herzog et al. |
| 2011/0151898 A1 | 6/2011 | Chandra et al. |
| 2011/0163160 A1 | 7/2011 | Zini et al. |
| 2011/0174920 A1 | 7/2011 | Yoeli |
| 2011/0181470 A1 | 7/2011 | Qiu et al. |
| 2011/0184643 A1 | 7/2011 | Abhyanker |
| 2011/0202426 A1 | 8/2011 | Cretney et al. |
| 2011/0219318 A1 | 9/2011 | Abhyanker |
| 2011/0231268 A1 | 9/2011 | Ungos |
| 2011/0246258 A1 | 10/2011 | Cragun et al. |
| 2011/0256895 A1 | 10/2011 | Palin et al. |
| 2011/0258028 A1 | 10/2011 | Satyavolu et al. |
| 2011/0264692 A1 | 10/2011 | Kardell |
| 2011/0291851 A1 | 12/2011 | Whisenant |
| 2012/0023196 A1 | 1/2012 | Grayson et al. |
| 2012/0047102 A1 | 2/2012 | Petersen et al. |
| 2012/0047448 A1 | 2/2012 | Amidon et al. |
| 2012/0077523 A1 | 3/2012 | Roumeliotis et al. |
| 2012/0084289 A1 | 4/2012 | Hutheesing |
| 2012/0096098 A1 | 4/2012 | Balassanian |
| 2012/0123667 A1 | 5/2012 | Guéziec |
| 2012/0126974 A1 | 5/2012 | Phillips et al. |
| 2012/0138732 A1 | 6/2012 | Olm et al. |
| 2012/0163206 A1 | 6/2012 | Leung et al. |
| 2012/0166935 A1 | 6/2012 | Abhyanker |
| 2012/0191606 A1 | 7/2012 | Milne |
| 2012/0191797 A1 | 7/2012 | Masonis et al. |
| 2012/0209775 A1 | 8/2012 | Milne |
| 2012/0221470 A1 | 8/2012 | Lyon |
| 2012/0224076 A1 | 9/2012 | Niedermeyer et al. |
| 2012/0232958 A1 | 9/2012 | Silbert |
| 2012/0239483 A1 | 9/2012 | Yankovich et al. |
| 2012/0239520 A1 | 9/2012 | Lee |
| 2012/0246024 A1 | 9/2012 | Thomas et al. |
| 2012/0254774 A1 | 10/2012 | Patton |
| 2012/0259688 A1 | 10/2012 | Kim |
| 2012/0264447 A1 | 10/2012 | Rieger, III |
| 2012/0270567 A1 | 10/2012 | Johnson |
| 2012/0278743 A1 | 11/2012 | Heckman et al. |
| 2012/0303168 A1* | 11/2012 | Halahan ............... A01G 25/165 700/284 |
| 2012/0331002 A1 | 12/2012 | Carrington |
| 2013/0005307 A1 | 1/2013 | Kim et al. |
| 2013/0024108 A1 | 1/2013 | Grün |
| 2013/0041761 A1 | 2/2013 | Voda |
| 2013/0041862 A1 | 2/2013 | Yang et al. |
| 2013/0054317 A1 | 2/2013 | Abhyanker |
| 2013/0055163 A1 | 2/2013 | Matas et al. |
| 2013/0068876 A1 | 3/2013 | Radu |
| 2013/0072114 A1 | 3/2013 | Abhyanker |
| 2013/0073375 A1 | 3/2013 | Abhyanker |
| 2013/0073474 A1 | 3/2013 | Young et al. |
| 2013/0080217 A1 | 3/2013 | Abhyanker |
| 2013/0103437 A1 | 4/2013 | Nelson |
| 2013/0105635 A1 | 5/2013 | Alzu'bi et al. |
| 2013/0110631 A1 | 5/2013 | Mitchell et al. |
| 2013/0151455 A1 | 6/2013 | Odom et al. |
| 2013/0153673 A1* | 6/2013 | Younis ................ A01G 25/16 239/1 |
| 2013/0159127 A1 | 6/2013 | Myslinski |
| 2013/0204437 A1 | 8/2013 | Koselka et al. |
| 2013/0254670 A1 | 9/2013 | Eraker et al. |
| 2013/0282842 A1 | 10/2013 | Blecon et al. |
| 2013/0297589 A1 | 11/2013 | Work et al. |
| 2013/0301405 A1 | 11/2013 | Fuste Vilella et al. |
| 2013/0303197 A1 | 11/2013 | Chandra et al. |
| 2013/0317999 A1 | 11/2013 | Zimberoff et al. |
| 2014/0032034 A1 | 1/2014 | Raptopoulos et al. |
| 2014/0039697 A1* | 2/2014 | Weiler ................ A01G 25/16 700/284 |
| 2014/0040179 A1 | 2/2014 | Shai Herzog et al. |
| 2014/0067167 A1 | 3/2014 | Levien et al. |
| 2014/0067704 A1 | 3/2014 | Abhyanker |
| 2014/0074736 A1 | 3/2014 | Carrington |
| 2014/0081450 A1 | 3/2014 | Kuehnrich et al. |
| 2014/0087780 A1 | 3/2014 | Abhyanker et al. |
| 2014/0095293 A1 | 4/2014 | Abhyanker |
| 2014/0100900 A1 | 4/2014 | Abhyanker |
| 2014/0108540 A1 | 4/2014 | Crawford |
| 2014/0108556 A1 | 4/2014 | Abhyanker |
| 2014/0108613 A1 | 4/2014 | Randall |
| 2014/0114866 A1 | 4/2014 | Abhyanker |
| 2014/0115671 A1 | 4/2014 | Abhyanker |
| 2014/0123246 A1 | 5/2014 | Abhyanker |
| 2014/0123247 A1 | 5/2014 | Abhyanker |
| 2014/0130140 A1 | 5/2014 | Abhyanker |
| 2014/0135039 A1 | 5/2014 | Sartipi et al. |
| 2014/0136328 A1 | 5/2014 | Abhyanker |
| 2014/0136414 A1 | 5/2014 | Abhyanker |
| 2014/0136624 A1 | 5/2014 | Abhyanker |
| 2014/0142848 A1 | 5/2014 | Chen et al. |
| 2014/0143061 A1 | 5/2014 | Abhyanker |
| 2014/0149244 A1 | 5/2014 | Abhyanker |
| 2014/0149508 A1 | 5/2014 | Middleton et al. |
| 2014/0164126 A1 | 6/2014 | Nicholas et al. |
| 2014/0165091 A1 | 6/2014 | Abhyanker |
| 2014/0172727 A1 | 6/2014 | Abhyanker et al. |
| 2014/0204360 A1 | 7/2014 | Dowski, Jr. et al. |
| 2014/0222908 A1 | 8/2014 | Park et al. |
| 2014/0254896 A1 | 9/2014 | Zhou et al. |
| 2014/0277834 A1 | 9/2014 | Levien et al. |
| 2014/0316243 A1 | 10/2014 | Niedermeyer |
| 2015/0309496 A1* | 10/2015 | Kah, III ............. G05B 19/0426 700/284 |

FOREIGN PATENT DOCUMENTS

| | | |
|---|---|---|
| KR | 1020120121376 A | 7/2012 |
| WO | 9808055 A1 | 2/1998 |
| WO | 9956143 A1 | 11/1999 |
| WO | 0054170 A2 | 9/2000 |
| WO | 0163423 A1 | 8/2001 |
| WO | 0201455 A2 | 1/2002 |
| WO | 02019236 A1 | 3/2002 |
| WO | 02041115 A2 | 5/2002 |
| WO | 03058540 A1 | 7/2003 |
| WO | 2005103624 A2 | 11/2005 |
| WO | 2006020471 A1 | 2/2006 |
| WO | 2007108927 A2 | 9/2007 |
| WO | 2007108928 A2 | 9/2007 |
| WO | 2007113844 A1 | 10/2007 |
| WO | 2008103149 A1 | 8/2008 |
| WO | 2008105766 A1 | 9/2008 |

(56) References Cited

FOREIGN PATENT DOCUMENTS

| WO | 2008108772 A1 | 9/2008 |
|---|---|---|
| WO | 2008118119 A1 | 10/2008 |
| WO | 2008123851 A1 | 10/2008 |
| WO | 2008111929 A3 | 11/2008 |
| WO | 2009138559 A1 | 11/2009 |
| WO | 2010103163 A1 | 9/2010 |
| WO | 2013188762 A1 | 12/2013 |
| WO | 2014121145 A1 | 8/2014 |

OTHER PUBLICATIONS http://www.zdnet.com/news/perspective-social-networking-for-all/149441.
http://www.coldwellbanker.com/real_estate_search;jsessionid=S8ok3kaZtBh5GKHoo-Yzo28Z.sky-node04.
http://cs.wellesley.edu/~cs315/315_PPTs/L19-SocialNetworks/Stuff/wellesley.pdf.
http://citeseerx.ist.psu.edu/viewdoc/download?doi=10.1.1.98.5230&rep=rep1&type=pdf.
http://www.ece.Isu.edu/xinli/Research/HeatMap_TVCG06.pdf.
Benchmark-Backed Nextdoor Launches as a Private Social Network for Neighborhoods, Techcrunch Article, Oct. 26, 2011 by Leena Rao (6 Pages) http://techcrunch.com/2011/10/26/benchmark-backed-nextdoor-launches-as-a-private-social-network-for-neighborhoods/.
Fatdoor Founder Sues Benchmark Capital, Saying It Stole His Idea for Nextdoor, All Things Digital Article, Nov. 11, 2011, by Liz Gannes (7 Pages). http://allthingsd.com/20111111/fatdoor-founder-sues-benchmark-capital-saying-it-stole-his-idea-for-nextdoor/.
Fatdoor CEO Talks About Balancing Security with Community, Wired Magazine, May 31, 2007, by Terrence Russell (2 Pages) http://www.wired.com/2007/05/fatdoor_ceo_tal/.
Fatdoor Launches Social Network for Your Neighborhood, Mashable Article, May 28, 2007, by Kristen Nicole (3 Pages) http://mashable.com/2007/05/28/fatdoor/.
Screenshots of Nextdoor website and its features—as submitted in Case5:14-cv-02335-BLF on Jul. 15, 2014 (Pages 19) http://www.nextdoor.com/.
Fatdoor turns neighborhoods into online social networks, VentureBeat News Article, May 28, 2007, by Dan Kaplan (pp. 4) http://venturebeat.com/2007/05/28/fatdoor-turns-neighborhoods-into-online-social-networks/.
Halloween Just Got Easier: Nextdoor Debuts Halloween Treat Map, Nextdoor Blog, Oct. 17, 2013, by Anne Dreshfield (pp. 6) http://blog.nextdoor.com/2013/10/17/halloween-just-got-easier-nextdoor-debuts-halloween-treat-map/.
Helping Neighbors Connect, Screenshot from FrontPorchForum website—screenshots of Aug. 21, 2014 (3 Pages) http://frontporchforum.com/.
Advocacy Strategy for the Age of Connectivity, Netcentric Advocacy: fatdoor.com (alpha), Jun. 23, 2007 (p. 1) http://www.network-centricadvocacy.net/2007/06/fatdoorcom-alph.html.
Silicon Valley venture capital and legal globalization Blog, WayBack Machine Blogs Apr. 8, 2008, by Raj V. Abhyanker (pp. 2) https://web.archive.org/web/20080706001509/http:/abhyanker.blogspot.com/.
Frontporchforum. screenshots. Jul. 19, 2006 webarchive.org 1-15 (herein FrontPorch) (pp. 15).
Fatdoor where 2.0 Launch Coverage Report, Jun. 21, 2007, by Sterling Communications (pp. 24).
Screenshot of Fatdoor on Wikipedia, Apr. 12, 2007 (p. 1).
Case No. 5-14-cv-02335-BLF Complaint *Fatdoor* v. *Nextdoor*, Northern District of California, with Exhibits A, B and C {Part 1 (pp. 258)} and Exhibits D, E, F, G and H {Part 2 (pp. 222)}, Jul. 15, 2014.
Expert Report—Forensics of Jon Berryhill, Report, *Nextdoor* v. *Abhyanker*, Aug. 8, 2014, by Berryhill Computer forensics Inc. (pp. 23).
Case No. 3:12-cv-05667-EMC Complaint *Nextdoor* v. *Abhyanker*, Northern District of California, Nov. 5, 2012 (pp. 46).
Expert Report—Patent of Jeffrey G. Sheldon, *Nextdoor* v. *Abhyanker*, Aug. 8, 2014 (pp. 7).
Exhibits of Expert Report—Patent of Jeffrey G. Sheldon, *Nextdoor* v. *Abhyanker*, with Attachments A, B, C, D and E (1/2) {Part 1 (pp. 46)} and Attachments E (2/2) and F {Part 2 (pp. 41)}.
Case No. 111-CV-212924 *Abhyanker* v. *Benchmark Capital Partners L.P.*, Superior Court of California, County of Santa Clara, Nov. 10, 2011 (pp. 78) http://www.scribd.com/doc/72441873/Stamped-COMPLAINT-Abhyanker-v-Benchmark-Capital-Et-Al-FILED-PUBLIC.
Neighbors Stop Diaper and Formula Thief in his Tracks, Nextdoor Blog, Aug. 15, 2014, by Anne Dreshfield (pp. 12) http://blog.nextdoor.com/.
Screenshot of Fatdoor website with its features—Aug. 21, 2014 (pp. 6) http://www.fatdoor.com/.
Screenshot of AirBnB website with its features—Aug. 21, 2014 (pp. 4) http://www.airbnb.com/.
Wikipedia entry AirBnB website—Aug. 21, 2014 (pp. 16) http://en.wikipedia.org/wiki/Airbnb.
AirBed&Breakfast for Connecting '07—Oct. 10, 2007 (1 Page) http://www.core77.com/blog/events/airbed_breakfast_for_connecting_07_7715.asp.
Case No. 5:14-cv-03844-PSG, Complaint *Fatdoor, Inc.* v. *IP Analytics LLC and Google Inc.*, Northern District of California, Aug. 25, 2014, (pp. 16).
Screenshot of Meetey on Crunch Base, Aug. 27, 2014, (pp. 3) http://www.crunchbase.com/organization/meetey.
Wikipedia entry Patch Media website—Aug. 27, 2014 (pp. 2) http://en.wikipedia.org/wiki/Patch_Media.
Wikipedia entry Yahoo! Groups website—Aug. 27, 2014 (pp. 7) http://en.wikipedia.org/wiki/Yahoo_groups.
Palo Alto News on Topix, Aug. 27, 2014, (pp. 3) http://www.topix.com/palo-alto.
Screenshot of My Neighbourhoods on Crunch Base, Aug. 27, 2014 (pp. 2) http://www.crunchbase.com/organization/my-neighbourhoods.
Screenshot of Dehood website, Aug. 27, 2014, (p. 1) http://www.dehood.com/home.
Wikipedia entry the Freecycle Network website—Aug. 27, 2014 (pp. 3) http://en.wikipedia.org/wiki/The_Freecycle_Network.
eDirectree Brings Group Wiki Twist to Social Networking, Techcrunch Article, Feb. 1, 2008 by Mark Hendrickson, (pp. 2) http://techcrunch.com/2008/02/01/edirectree-brings-group-wiki-twist-to-social-networking/.
Wikipedia entry Meetup website—Aug. 27, 2014 (p. 1) http://en.wikipedia.org/wiki/Meetup_(website).
Wikipedia entry Google Maps website—Aug. 27, 2014 (p. 18) http://en.wikipedia.org/wiki/Google_Maps.
Screenshot of Facebook website for groups, Aug. 27, 2014, (p. 1) https://www.facebook.com/about/groups.
Facebook Engineers bring Google-F Circles to Facebook, Article on ZDNet by Emil Protalinski, Jul. 3, 2011, (pp. 2) http://www.zdnet.com/blog/facebook/facebook-engineers-bring-google-circles-to-facebook/1885.
Screenshot of Uber website, Aug. 27, 2014, (pp. 5) https://www.uber.com/.
Screenshot of Lyft website, Aug. 27, 2014, (pp. 5) https://www.lyft.com/.
Wikipedia entry Google driverless car—Aug. 27, 2014 (pp. 4) http://en.wikipedia.org/wiki/Google_driverless_car.
Wikipedia entry Uber (company)—Aug. 27, 2014 (pp. 7) http://en.wikipedia.org/wiki/Uber_(company).
Wikipedia entry Autonomous car—Aug. 27, 2014 (pp. 15) http://en.wikipedia.org/wiki/Autonomous_car.
Screenshot of sidecar website, Aug. 27, 2014 (p. 1) http://www.sidecar.com/.
Screenshot of patch media website, Aug. 27, 2014 (pp. 6) http://patch.com/.
Screenshot of i-neighbors website, Aug. 27, 2014 (pp. 3) https://www.i-neighbors.org/howitworks.php.
"Friends and Neighbors on the Web", 2001 by Lada A. Adamic et al. (pp. 9) http://www.hpl.hp.com/research/idl/papers/web10/fnn2.pdf.

(56) References Cited

OTHER PUBLICATIONS

"A social influence model of consumer participation in network- and small-group-based virtual communities", International Journal of Research in Marketing, 2004 by Utpal M, Dholakia et al. (pp. 23) http://www-bcf.usc.edu/~douglast/620/bettina1.pdf.

"BuzzMaps: a prototype social proxy for predictive utility", ACM Digital Library, 2003 by Azzari Caillier Jarrett et al. (Pages) http://dl.acm.org/citation.cfm?id=948547&dl=ACM&coll=DL&CFID=456946313&CFTOKEN=50139062.

"Direct Annotation: A Drag-and-Drop Strategy for Labeling Photos", University of Maryland, 2000 by Ben Shneiderman et al. (pp. 8) http://hcil2.cs.umd.edu/trs/2000-06/2000-06.pdf.

"Notification for Shared Annotation of Digital Documents", Technical Report MSR—TR-2001-87, Sep. 19, 2001 by A. J. Bernheim Brush et al. (pp. 9) http://research.microsoft.com/pubs/69880/tr-2001-87.pdf.

"HT06, Tagging Paper, Taxonomy, Flickr, Academic Article, ToRead", Yahoo Research Berkeley, CA, 2006 by Cameron Marlow et al. (pp. 9) http://www.danah.org/papers/Hypertext2006.pdf.

"Computer Systems and the Design of Organizational Interaction", by Fernando Flores et al. (pp. 20) http://cpe.njit.edu/dlnotes/CIS/CIS735/ComputerSystemsandDesign.pdf.

"ChipIn—the easy way to collect money", Louis' Really Useful Finds, Mar. 12 (p. 1) http://reallyusefulthings.tumblr.com/post/28688782/chipin-the-easy-way-to-collect-money.

\* cited by examiner

NETWORK ENABLED GARDENING WITH A REMOTELY CONTROLLABLE POSITIONING EXTENSION

FIELD OF TECHNOLOGY

This disclosure relates generally to a horticultural system, and in one exemplary embodiment, to a system, method, and apparatus of network enabled gardening with a remotely controllable positioning extension.

BACKGROUND

A family may wish to grow vegetables and flowering plants inside and/or outside a home. For example, the family may create a garden of vegetables and flowering plants in their front yard and/or in a greenhouse area of their kitchen window. A family member (e.g., a child, a parent) may love gardening and flowers, and may prefer manually watering the garden because it may feel more natural, satisfying, and/or rewarding than through a timed irrigation system. Furthermore, the family member may prefer assessing temperature, sunshine, wind, and/other environmental conditions before deciding whether to manually water their garden.

The family may travel on weekends often and may not be at home on a frequent basis. In addition, the family may lead busy schedules, governed by school, work, and/or family activities (e.g., miniature golf, after school art programs, choir, cherry picking, weekend getaways, Church). In addition, the family may remember to water their garden of vegetables when physically distant from the garden, for example, while at school, while on a weekend getaway, etc. However, because the garden may not be within an immediate proximity, the family may not be able to water the garden. Worse yet, the family may forget to water the garden after returning home. During these times, at least one member of the family may have a mobile device and/or Internet connectivity. However, there may not be anyone at the home where the garden is located to manually telephone in a request for watering. As a result, the garden of vegetables and flowering plants may not receive adequate water supply and/or beneficial fertilizers regularly. As such, fewer flowers and vegetables may grow in the garden than would otherwise if the garden were to receive adequate water and nutrients.

SUMMARY

A watering apparatus and associated methods and systems to enable networked gardening with a remotely controllable positioning extension are disclosed. In one aspect, the watering apparatus includes a weather-resistant housing to encompass a micro-processor and a communications circuitry. In addition, the watering apparatus includes a weather-resistant camera communicatively coupled with the weather resistant housing through the communications circuitry. An input connector directs water through a partitioned channel from the weather-resistant housing responsive to a signal from the microprocessor through a pressure regulated valve. The watering apparatus is connected to a flexible extension coupled with the weather-resistant housing to automatically transport the water directed through the partitioned channel to a desired location within a central view of a focused angle of the weather-resistant camera.

The watering apparatus may wirelessly register a public and/or private Internet Protocol (IP) address with a local access point of a network through the communications circuitry. Further, the watering apparatus may be accessed through a mobile device through a network based on an access control policy configured by a user of the watering apparatus. The watering apparatus may also communicate a visual data of the weather-resistant camera including the focused angle and/or the central view to the mobile device through the network. The weather-resistant camera may be repositioned based on a reposition data received from the mobile device through the network when a haptic gesture is applied on a touchscreen of the mobile device. The watering apparatus may activate the water at a communicated pressure through the partitioned channel using the pressure regulated valve based on a trigger data received from the mobile device through the network. The watering apparatus may deactivate the water through the partitioned channel using the pressure regulated valve based on a stop data received from the mobile device through the network.

Further, the watering apparatus may include a rainfall sensor in the weather-resistant housing to communicate an amount of rainfall detected by the watering apparatus to the mobile device through the network. The watering apparatus may also include a humidity sensor in the weather-resistant housing to communicate a relative humidity detected by the watering apparatus to the mobile device through the network. In addition, the watering apparatus may include a temperature sensor in the weather-resistant housing to communicate a temperature data to the mobile device through the network.

Further, the watering apparatus may comprise a solar panel affixed on the upper surface of the watering apparatus to power circuitry in the weather-resistant housing.

In another aspect, an irrigation system includes a weather-resistant housing encompassing a micro-processor and a communications circuitry, and a weather-resistant camera communicatively coupled with the weather resistant housing through the communications circuitry. The irrigation system also includes a mobile device to reposition the weather-resistant camera to direct water to a plant of a garden in a central view of the weather-resistant camera based on commands communicated from the mobile device to the microprocessor through a network.

Further, the irrigation system may include an input connector to direct the water through a partitioned channel from the weather-resistant housing responsive to a signal from the microprocessor through a pressure regulated valve. The irrigation system may also include a flexible extension coupled with the weather-resistant housing to automatically transport the water directed through the partitioned channel to a desired location, as designated by a user using the mobile device.

In yet another aspect, an irrigation method may include repositioning a weather-resistant camera wirelessly coupled with a remotely located mobile device based on a haptic gesture applied on a touchscreen of the mobile device. The irrigation method further include adjusting a water pressure of a partitioned channel between an input connector and a flexible extension of a watering tube based on a haptic gesture applied on the remotely located mobile device. Water is directed to a plant of a garden in a central view of the weather-resistant camera based on a command communicated from the mobile device to a microprocessor communicatively coupled with the weather-resistant camera and to the watering tube through a network.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a device and/or a system to enable networked gardening with a remotely controllable positioning extension. Although the present embodiments have been described with reference to specific example embodiments, it will be evident that various modifications and changes may be made to these embodiments without departing from the broader spirit and scope of the various embodiments.

Figure 1:
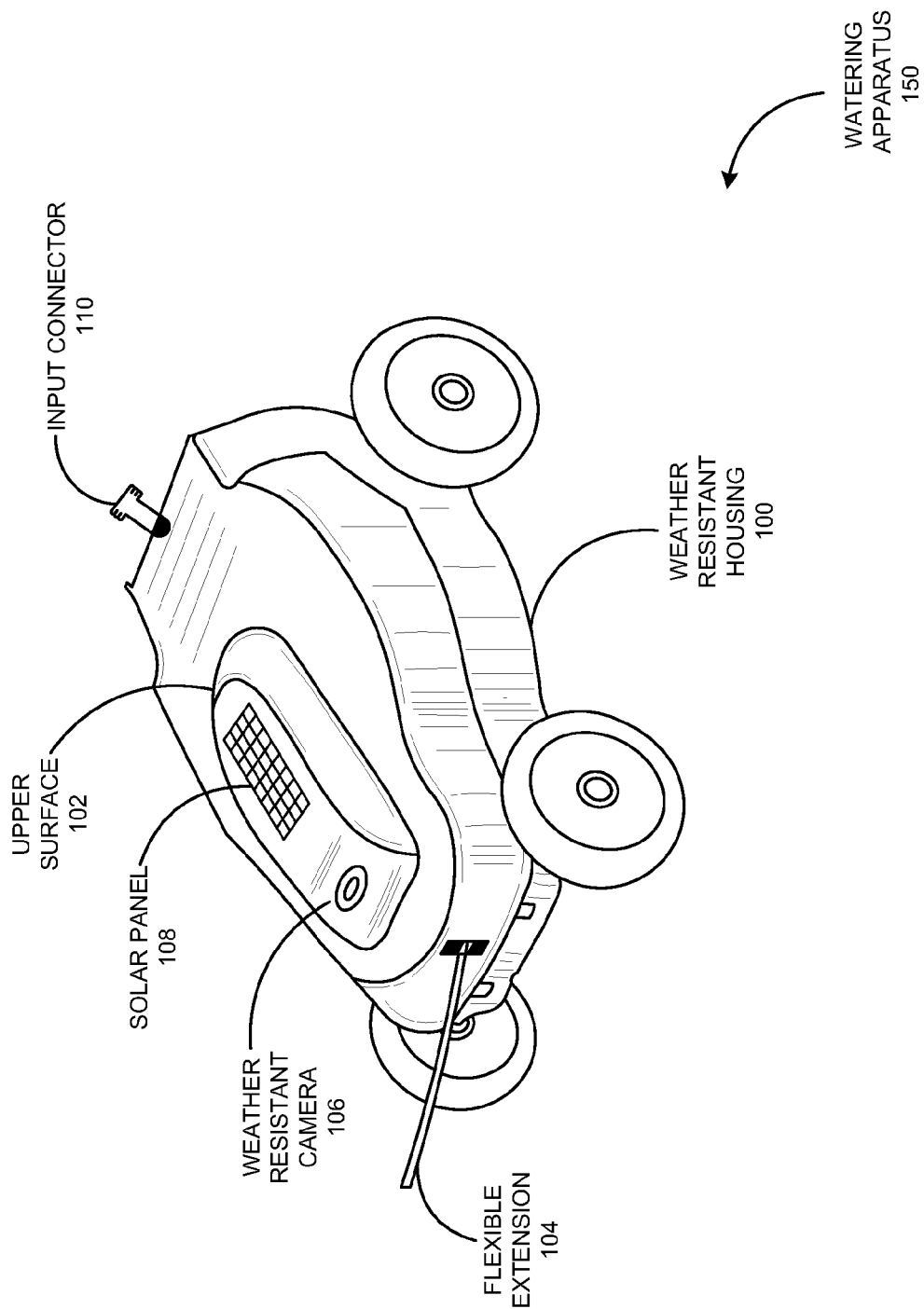
FIG. 1 illustrates a watering apparatus having a weather-resistant camera, according to one or more embodiments.

FIG. 1 shows a watering apparatus 150. The watering apparatus 150 directs a water 402 to the desired location, according to one or more embodiments. The watering apparatus 150 is communicatively coupled to an access point 312 in a local area network (LAN) 300. In one or more embodiments, watering apparatus 150 may comprise of a weather resistant housing 100.

Weather resistant housing 100 may be made of a plastic (e.g. high-density polyethylene) other forms of plastic are within the scope of the exemplary embodiments discussed herein. The weather resistant housing 100 may provide an aesthetically appealing look to the watering apparatus 150 and/or protect the internal pieces of the watering apparatus 150. Further, the weather resistant housing may be affixed to an upper surface 102 and an input connector 110.

The upper surface 102 may be made of a plastic (e.g. high-density polyethylene) as well. Upper surface 102 may provide a platform to mount a solar panel 108 and/or a weather resistant camera 106. The upper surface 102 may be affixed to the topside of the watering apparatus 150.

A flexible extension 104 may be protruding from the weather resistant housing, angled away from the ground. The flexible extension 104 may be made of a water transportation pipe and/or hose (e.g. rubber hose, polyvinyl chloride (PVC) pipe, etc.). Other forms of water transportation hoses are within the scope of the exemplary embodiments discussed herein. The flexible extension may connect to a pressure regulated valve 404. The goal of the flexible extension (piece 104) may be to rotate around a pivot inside a cavity of the water resistant housing 100 to enable the watering apparatus 150 to automatically position the watering apparatus near a root of a plant of a garden to be watered through the Internet. For example, a WiFi or 4G cellular connection to which the watering apparatus is coupled may enable the watering apparatus 100 to reposition its piece 104 based on instructions received from a mobile iPhone and/or Android application communicatively coupled with the watering apparatus 150 through a neighborhood social network (e.g., Fatdoor).

The weather resistant camera 106 may be located on the front of the upper surface 102. The weather resistant camera 106 may be mounted as to provide a clear view of what is in front of the apparatus 150. The weather resistant camera 106 may consist of a camera module encompassed in an IP66 rated plastic enclosure with a polycarbonate lens cover. Other forms of weather resistant camera housing are within the scope of the exemplary embodiments discussed herein. The weather resistant camera 106 may communicate with a microprocessor 200 to provide a visual data in a central view 606 to a user 308 of a mobile device 304 (to be discussed with regards to FIG. 2 and FIG. 3).

According to one or more embodiments, solar panel 108 may be affixed to the topside of the upper surface 102. The solar panel 108 may be comprised of wafer based crystalline silicon cells, wherein the solar panel 108 generates electricity through the photovoltaic effect. Other forms of using transferring solar radiation to useable energy by the watering apparatus 150 are within the scope of the exemplary embodiments discussed herein. The solar panel 108 may be used to provide electricity to the entire apparatus, according to one or more embodiments.

According to one or more embodiments, the input connector 110 may be used to connect to a hose 502 to the watering apparatus 150. The input connector may comprise of a ⅜" brass hose female adapter. The hose 502 may be used so that existing plumbing, associated with a home, a garden, etc., can be utilized. The hose may be made of a rubber material or any other common water transportation materials.

Figure 2:
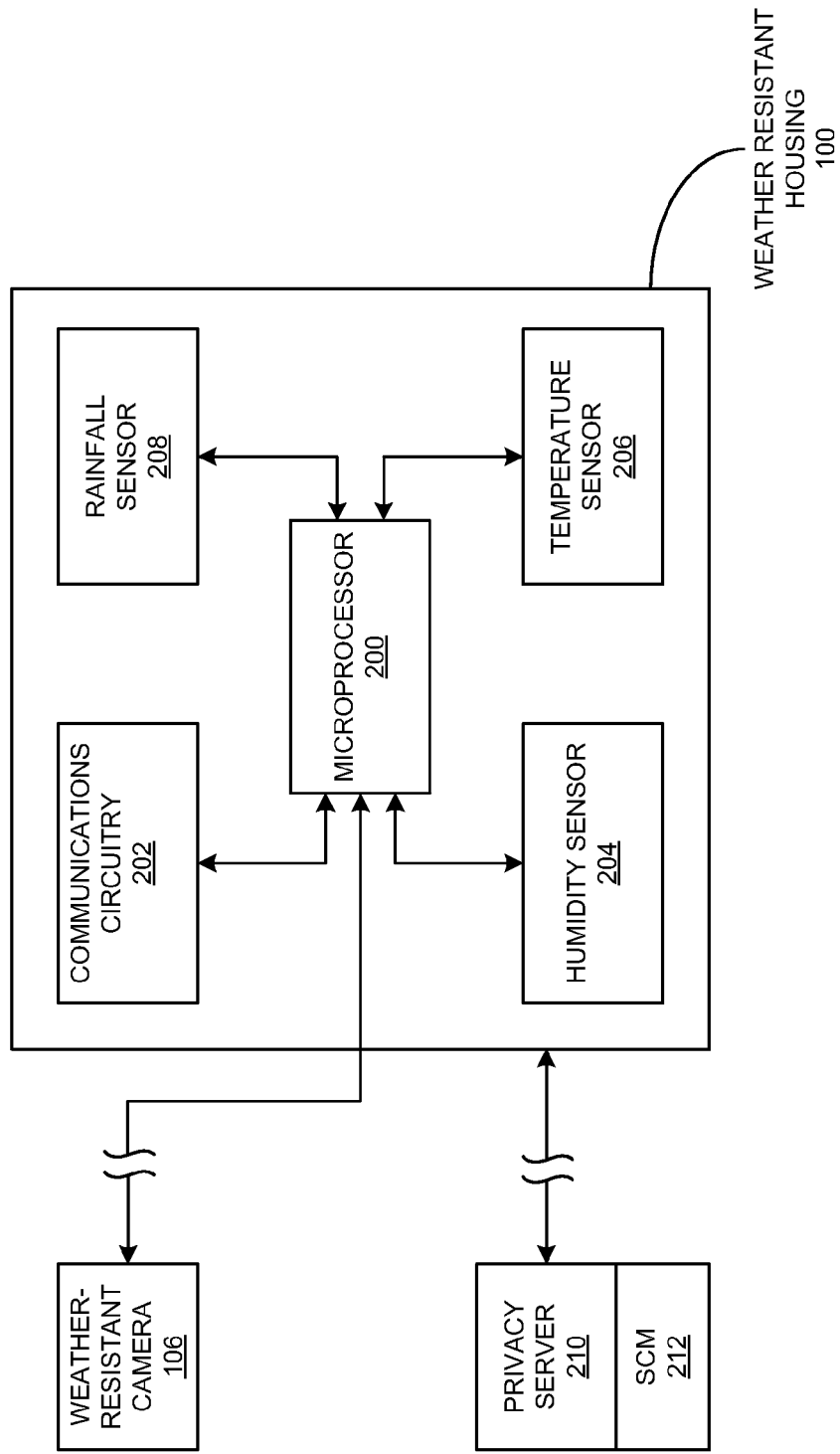
FIG. 2 is a schematic representation of the internal circuitry of the watering apparatus of FIG. 1, according to one or more embodiments.

According to one or more embodiments, FIG. 2 illustrates a schematic view of the internal circuitry of the watering apparatus 150 in one or more embodiments. In one or more embodiments, the microprocessor 200 may consist of a programmable integrated circuit or multiple programmable integrated circuits. The integrated circuit may take digital data (e.g. a stop data 604, a trigger data 600, a reposition data 602) and/or provide a certain result as processed according to the instructions stored in the memory. The microprocessor may be communicatively coupled to a communications circuitry 202, a rainfall sensor 208, a humidity sensor 204, a temperature sensor 206, and the weather resistant camera 106. Microprocessor 200 may be located within the weather resistant housing 100.

In one or more embodiments, the communications circuitry 202 may consist of a wireless network interface controller. This may enable communication with mobile devices that wirelessly control the watering apparatus 150 through a mobile phone through a WiFi hotspot in the home and/or a cellular network. In one or more embodiments, the communications circuitry 202 may couple with a neighborhood social network, such as Fatdoor and/or Nextdoor so that a verified community of neighbors can control the watering apparatus using various circuitries and modules of the watering apparatus 150. When the watering apparatus 150 is coupled with the neighborhood social network (e.g., in which individual users verify a present geo-spatial location associate with each other's homes using a phone and/or a postcard mailed to home verification system), the watering apparatus 150 may develop additional functionality. For example, in one embodiment, a group of neighbors living around a specific neighborhood (e.g., each neighbor verified as living in that neighborhood) may then water a community garden and/or may take turns watering a single garden. This way, a community may govern the distribution of water in its own gardens based on a desire of the residents confirmed to live in that neighborhood through the neighborhood social network. The communications circuitry 202 may be used to connect the watering apparatus 150 to the access point 312. The communications circuitry 202 may be connected to the microprocessor 200 and/or communicatively coupled with the access point 312. The communications circuitry 202 may be housed within the weather resistant housing 100 of the watering apparatus 150.

The humidity sensor 204 may be located inside of the weather resistant housing 100 and communicatively coupled with the microprocessor 200. The humidity sensor 204 may provide the user 308 of the mobile device 304 a relative humidity 612 of the area the watering apparatus 150 is located at. The humidity sensor 204 may be any of the following electronic hygrometers, including but not limited to a chilled mirror dew point hygrometer, a capacitive humidity sensor, and/or a resistive humidity sensor. A chilled mirror dew point hygrometer use a temperature controlled mirror to maintain equilibrium between evaporation and condensation using optoelectronics and therefore, measuring the dew point which can be used to figure out the relative humidity 612. A capacitive humidity sensor measures the relative humidity 612 by detecting changes as the polymer or metal oxide dielectric constant is greatly affected by differences in humidity. Resistive humidity sensors work by measuring differences in electric resistance as the material's resistance changes with varying humidity. Other forms of relative humidity 612 measurement devices are within the scope of the exemplary embodiments discussed herein. The temperature sensor 206 may be a thermistor. A thermistor is a resistor, wherein the resistance is greatly affected by the change in temperature. The temperature sensor 206 may be used to provide a temperature data 610 of the area where the watering apparatus 150 is located. The temperature sensor 206 may be communicatively coupled to the microprocessor 200 and/or enclosed in the weather resistant housing 100 of the watering apparatus 150. Other forms of temperature measurement devices are within the scope of the exemplary embodiments discussed herein. The rainfall sensor 208 may be located in the weather resistant housing 100 of the watering apparatus 150. The rainfall sensor 208 may be communicatively coupled to the microprocessor 200. The rainfall sensor 208 may provide a data about the amount of rainfall 614 in a certain time period that occurred in the area of the watering apparatus 150. The rainfall sensor may be any of the following including but not limited to, a standard rain gauge, a weight precipitation gauge, a tipping bucket rain gauge, and/or an optical rain gauge. A standard rain gauge consists of two graduated cylinders, one large one with a smaller one inside. A weight precipitation gauge determines the amount of rainfall 614 by weighing the collected water. A tipping bucket rain gauge collects rainwater on a lever, and once a predetermined about has been collected the lever will tip, dump the water, and activate a switch, which is then recorded electronically. An optical rain gauge uses a laser diode and a photo transistor detector, such that when enough water is collected to form a drop, the drop falls between the laser diode and photo transistor detector. The scattering affect is counted and a rainfall data is derived from such information. Other forms of rainfall measurement devices are within the scope of the exemplary embodiments discussed herein.

A privacy server 210 may coupled with the weather resistant housing 100 of the watering apparatus 150 through a network (e.g., an internet) to apply an address verification algorithm associated with each user of the online community to verify that each user lives at a residence associated with a claimable residential address of an online community formed through a social community module 212 of the privacy server 210 using the processor and the memory. The privacy server 210 may generate a latitudinal data and a longitudinal data associated with each claimable residential address of the online community associated with each user of the online community. The privacy server 210 may automatically determine a set of access privileges in the online community associated with each user of the online community by constraining access in the online community based on a neighborhood boundary determined using a Bezier curve algorithm of the privacy server. The watering apparatus 150 may be constrained in accessibility only to those neighbors that are verified to live in a neighborhood boundary in which the watering apparatus is located. The watering apparatus may function as a community resource in the online community such that neighbors verified as living inside the neighborhood boundaries and which are part of a gardening club of the online community can collectively take turns watering a community garden of the online community.

Figure 3:
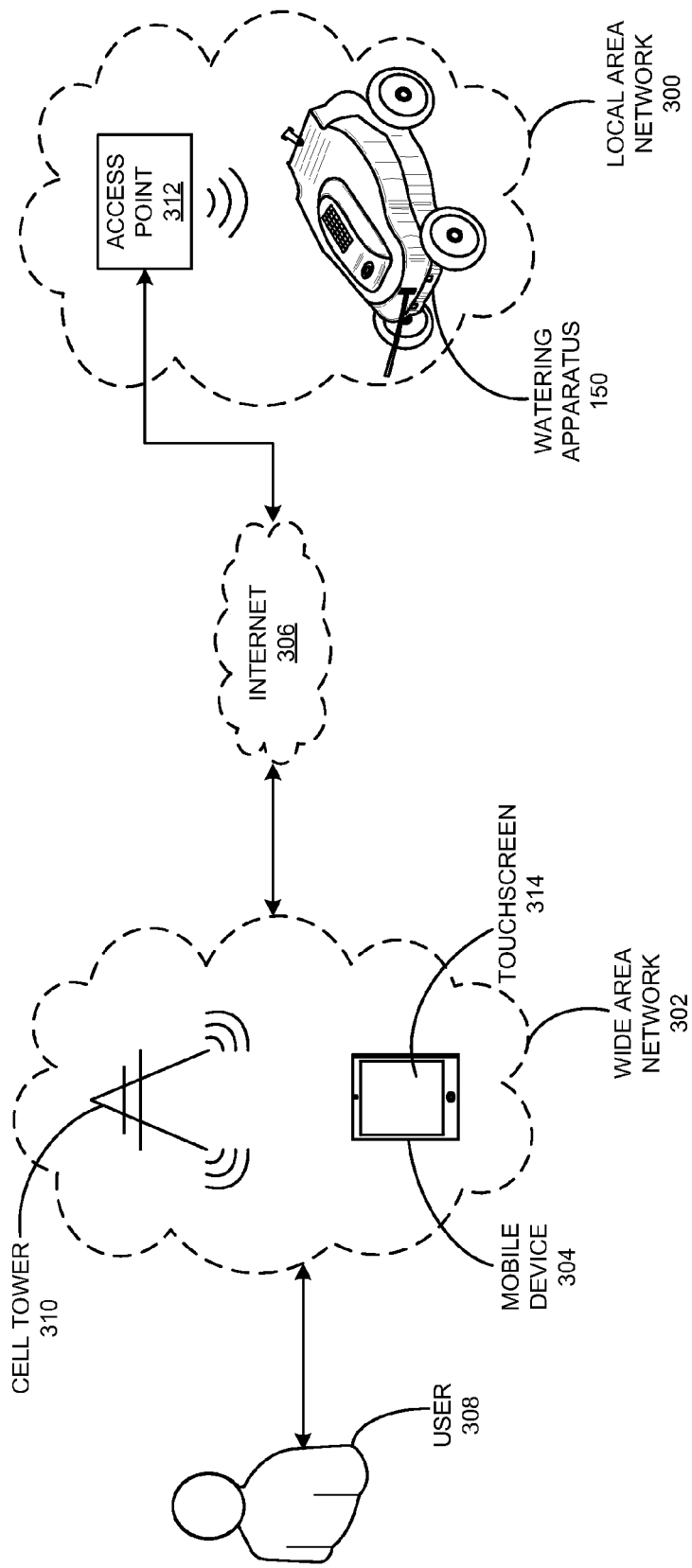
FIG. 3 is a network view of communication with the watering apparatus of FIG. 1 in a local area network through a mobile device in a wide area network, according to one or more embodiments.

FIG. 3 illustrates a network view, showing how the user 308 may interact with the watering apparatus 150 remotely in one or more embodiments. In one or more embodiments, the LAN 300 may be used such that the watering apparatus 150 may receive and/or send information through an Internet 306 using the nearby access point 312. A LAN is a local area network that interconnects computers. LAN's are most commonly built using Ethernet wires and/or WiFi®. For example, an Internet modem may be communicatively coupled to a wireless router, which is comprised of an access point 312, which allows the watering apparatus 150 to be connected to the Internet. A wide area network (WAN) 302 is a network that is used to transmit data over long distances and between localized networks such as, local area networks, metropolitan area networks, campus area networks, etc. The WAN 302 may allow the mobile device 304 to use a cell tower 310 to connect to the Internet 306. The Internet 306 is a global network of computer networks using the Transmission Control Protocol/Internet Protocol. The Internet 306 may allow communication between two devices in separate LAN's, WAN's, etc. Other forms of data transfers are within the scope of the exemplary embodiments discussed herein A mobile device 304, such as a cell phone or tablet, is a personal handheld computing device. Other forms of mobile computer not mentioned herein are within the scope of the exemplary embodiments discussed herein. In one or more embodiments, the mobile device 304 may allow a user 308 to access the watering apparatus 150 remotely, using some sort of network communications. For example, the mobile device 304 may connect to the Internet 306 via the cell tower 310, which allows the mobile device 304 to access the LAN 300 that the watering apparatus 150 is connected to. The cell tower 310 comprises of electronic communication circuits and antennas, which are placed in a high place, usually a radio mast, a tower, or building. A cell tower is one cell in a network of cell towers to make up a cellular network. The access point 312 is a device that allows a wireless device to access a wired network. This is often housed in a router, which is often used in a LAN. In one or more embodiments the access point 312 may be used to allow the watering apparatus 150 to connect to the Internet 306 wirelessly.

Figure 6:
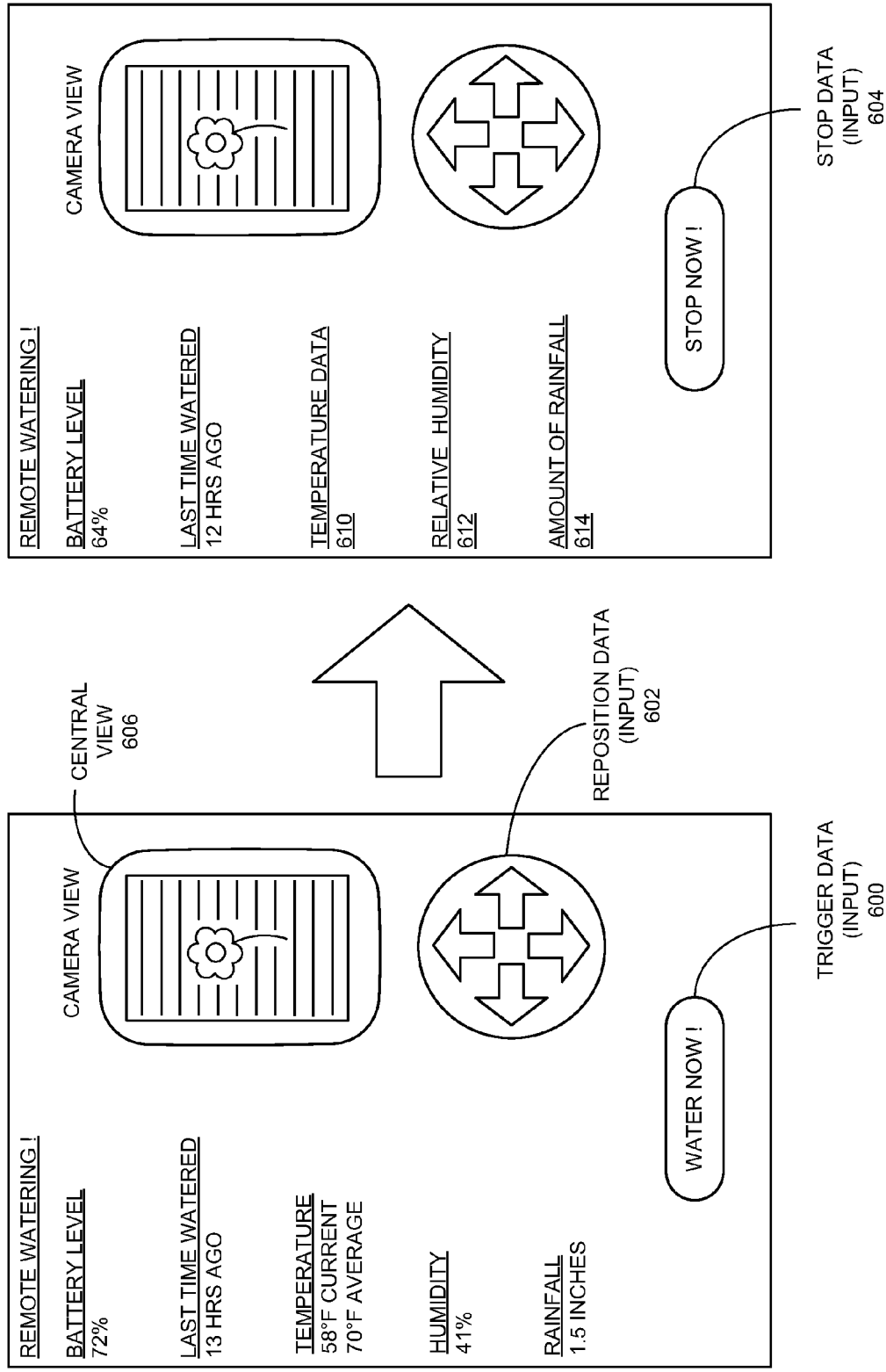
FIG. 6 is a user interface view of an operation of the mobile device in which various command can be communicated from the mobile device of FIG. 3 to the watering apparatus of FIG. 1, according to one or more embodiments.

A touchscreen 314 is a visual display that a user 308 can use to see information sent to the mobile device 304. A user 308 may also be able to apply haptic gestures to the touchscreen 314 for a desired action. FIG. 6 illustrates two user interface views that the user 308 would see on the touchscreen 314 of the mobile device 304 in one or more embodiments. In one or more embodiments, user 308 may be able to apply a haptic gesture in such a way as to send the trigger data 600, the reposition data 602, and/or the stop data 604. The trigger data 600 may cause the water 402 to begin to flow and spray from the flexible extension 104. The reposition data 602 may allow the user to move the watering apparatus 150 to a more desired location. This may be used to effectively water a spot that was previously unreachable and/or neglected. The stop data 604 may cause the water 402 to stop flowing and cease the watering process. The user may also be able to see the central view 606 of the watering apparatus 150. The touchscreen 314 may show a central view 606 as captured by the weather resistant camera 106.

Figure 4:
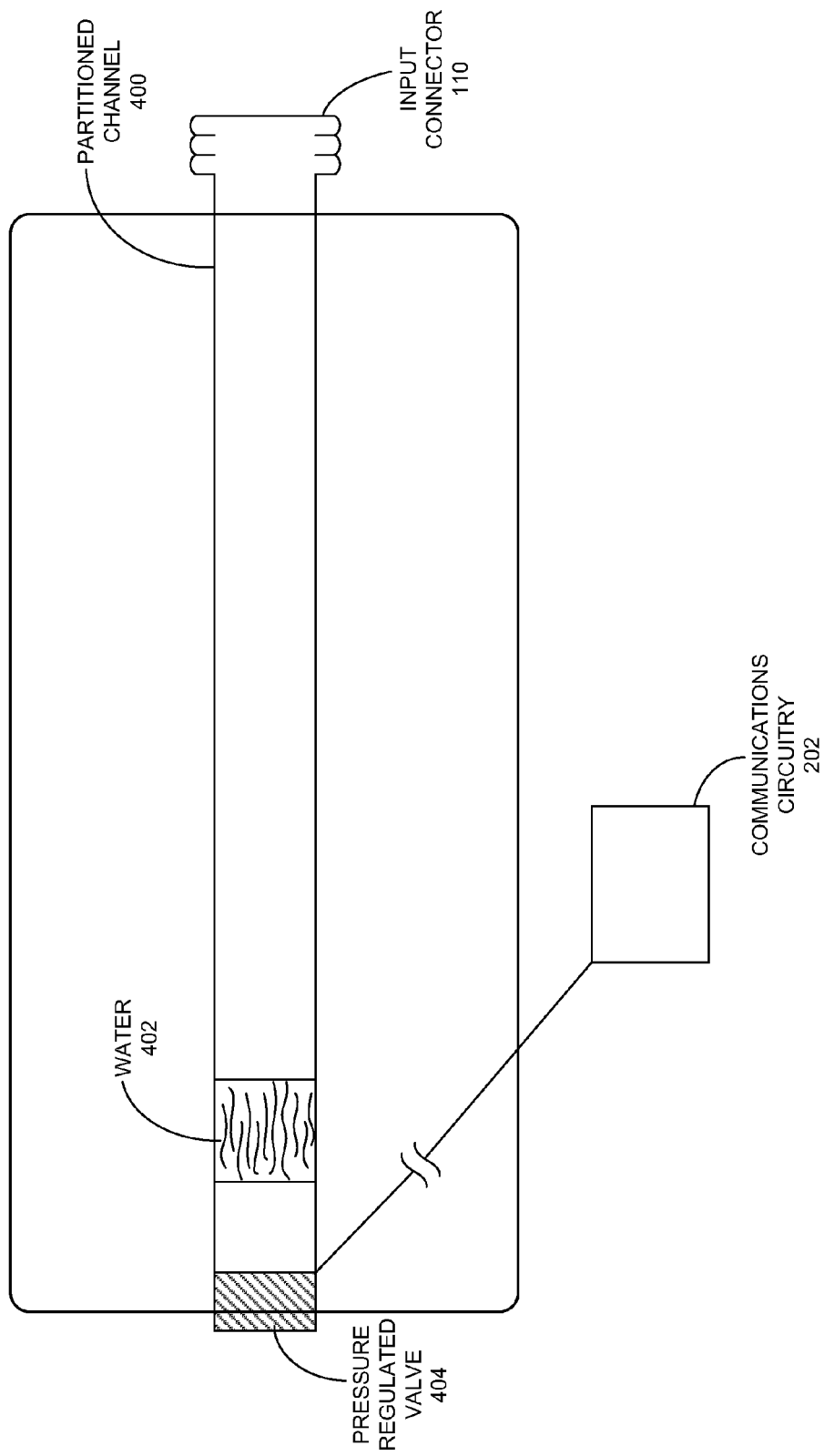
FIG. 4 is a flow diagram illustrating a pressurize regulated valve that can control water through a portioned channel of the watering apparatus of FIG. 1, according to one or more embodiments.

FIG. 4 illustrates a flow diagram of the water 402 through the apparatus in one or more embodiments. In one or more embodiments, the water may pass through the input connector 110, then a partitioned channel 400, through the pressure regulated valve 404, and/or out the flexible extension 104. The partitioned channel 400 may comprise of a hose with connector on one end to fit on the input connector 110. The partitioned channel 400 may be made of a rubber or PVC piping type material. The partitioned channel 400 may feed the water 402 to the pressure regulated valve 404. The partitioned channel 400 may be located within the weather resistant housing 100. In one or more embodiments, the pressure regulated valve 404 may be used to control the flow of water sprayed from the watering apparatus 150. The pressure regulated valve 404 may be controlled via an electrical signal transmitted by the microprocessor 200. The pressure regulated valve 404 may connect the flexible extension 104 and the partitioned channel 400. The pressure regulated valve 404 may be housed in the weather resistant housing 100.

Figure 5:
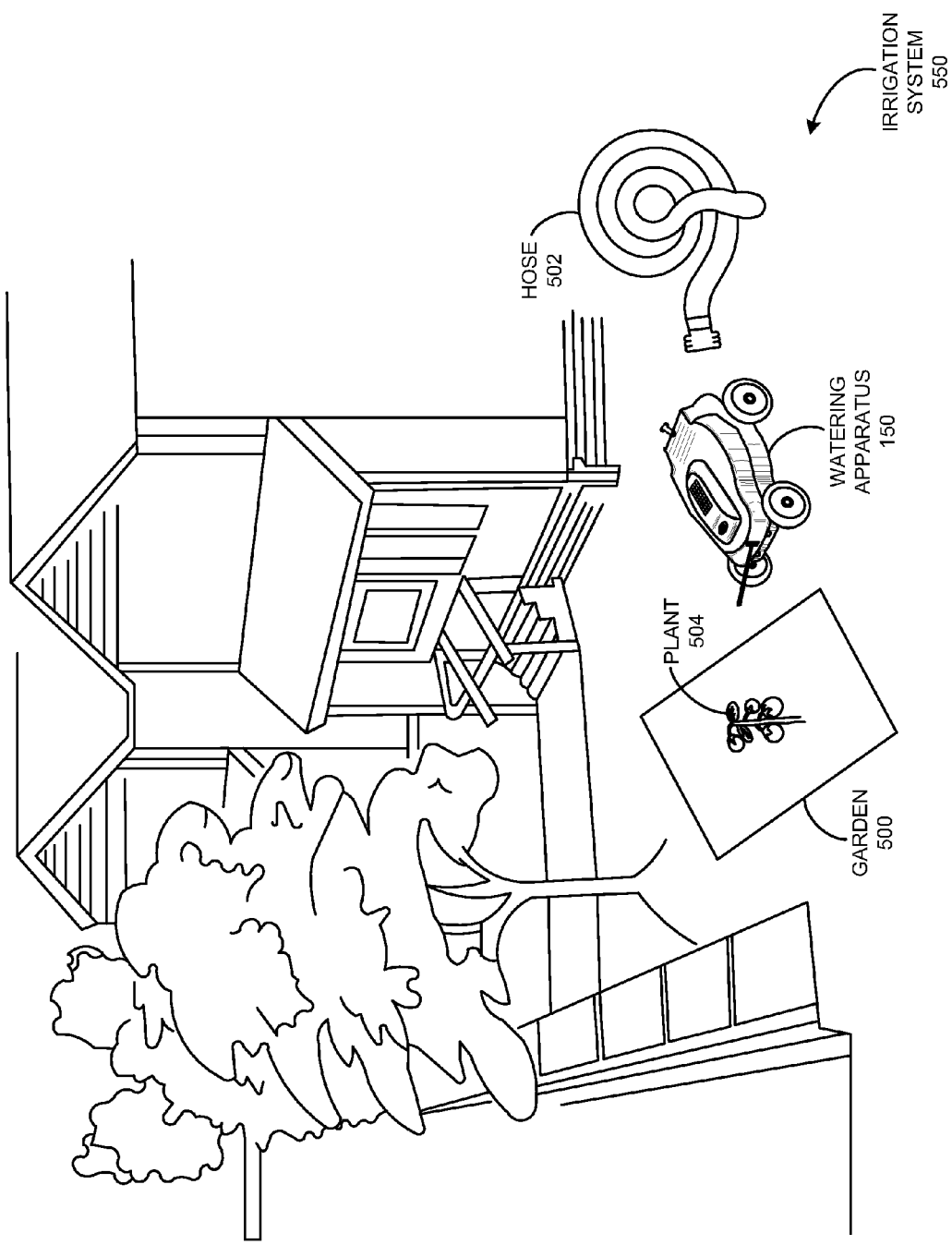
FIG. 5 illustrates water directed to a plant of a garden in a central view of the weather-resistant camera of FIG. 1 based on a command communicated from the mobile device of FIG. 3 to a microprocessor communicatively coupled with the weather-resistant camera and to the watering tube through the networks described in FIG. 3, according to one or more embodiments.

FIG. 5 illustrates an irrigation system 550 in one or more embodiments. In one or more embodiments, irrigation system 550 may comprise of a garden 500 with a plant(s) 504, a watering apparatus 150, and/or a hose 502. The hose 502 may be used so that the watering apparatus 150 can receive water directly from the existing plumbing system. The hose 502 may be able to be directly coupled through the input connector 110 on the backside of the watering apparatus 150. A garden is usually a planned space set aside for the cultivation of plants. The watering apparatus 150 may be able to target a specific plant 504 in the garden 500 to direct the water 402 at.

In one embodiment the watering apparatus 150 may be used to direct the water 402 to the plant 504. The user 308 may send the reposition data 602, the trigger data 600, and/or the stop data 604 to the watering apparatus 150 by a mobile device via a signal through a network. The data may be communicated via radio waves, by sending a data signal from the mobile device 304 to the cell tower 310. The cell tower 310 may then relay that signal via the Internet 306 to an access point 312 of the LAN 300, of which the watering apparatus 150 may be communicatively coupled to. The reposition data 602 may cause the watering apparatus 150 to physically move from one spot to another. The stop data 604 may cause the watering apparatus 150 to stop directing the water 402 to a plant 504. The trigger data 600 may cause the watering apparatus 150 to start directing the water 402 to a plant 504. Alternatively, the watering apparatus 150 may send the relative humidity data 612, the temperature data 610, the rainfall data, and/or a visual data back to the mobile device 304 of the user 308. The watering apparatus 150 may send this data via a radio wave. The communications circuitry 202 of the watering apparatus 150 would send a signal to the access point 312. The access point 312 would send the signal to a cell tower 310 nearby the user 308 of the mobile device 304 via the Internet 306. The touchscreen 314 of the mobile device 304 may display the relative humidity data 612, the temperature data 610, and/or the rainfall data. The touchscreen 314 may also display the visual data, in the central view 606, captured by the weather resistant camera 106.

Figure 7:
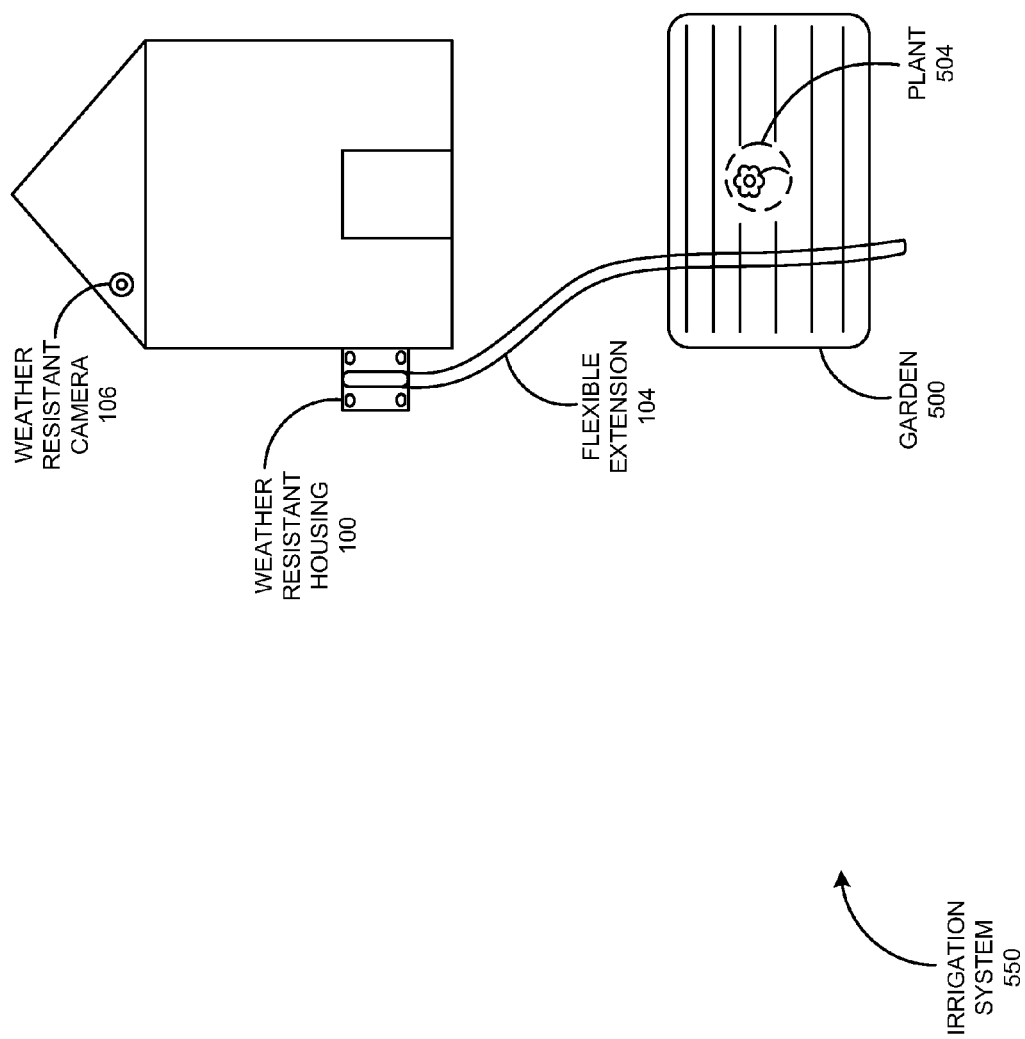
FIG. 7 illustrates an alternative embodiment in which an irrigation system is modified to enable the various operations described in FIGS. 5 and 6 between the mobile device of FIG. 3 and plants in a garden of a personal dwelling, according to one or more embodiments.

In an alternate embodiment, as illustrated in FIG. 7, an irrigation system 550 consists of non-moveable weather resistant housing 100. A weather resistant housing 100 may be affixed in a nearby location of the garden 500. The weather resistant housing 100 may still house, the microprocessor 200, the communications circuitry 202, the rainfall sensor 208, the humidity sensor 204, the temperature sensor 206, the partitioned channel 400, and/or the pressure regulated valve 404. It is important to note, that in this embodiment the weather resistant housing 100 may not be able to change location with a command communicated through a mobile device 304. The weather resistant camera 106 may be communicatively connected to the microprocessor 200. The weather resistant camera 106 may be mounted on a vantage point to view the whole garden 500 from one central view 606. The pressure regulated valve 404 may be coupled to a flexible extension 104. The mobile device 304 may receive a humidity data, a rainfall data, a temperature data 610, and/or a visual data. The irrigation system 550 may send the data via a radio wave. The communications circuitry 202 of the irrigation system 550 may send a signal to the access point 312. The access point 312 may then send the signal to a cell tower 310 nearby the user 308 of the mobile device 304 via the Internet 306. The touchscreen 314 of the mobile device 304 may display the relative humidity data 612, the temperature data 610, and/or the rainfall data. The mobile device 304 may be able to send the irrigation system a stop data and/or trigger data by a mobile device via a signal through a network. The data may be communicated via radio waves, by sending a data signal from the mobile device 304 to the cell tower 310. The cell tower 310 may then relay the signal via the Internet 306 to an access point 312 of the LAN 300, of which the irrigation system 550 may be communicatively coupled to. The stop data 604 may cause the watering apparatus 150 to stop directing the water 402 to a plant 504. The trigger data 600 may cause the watering apparatus 150 to start directing the water 402 to a plant 504.

Figure 8:
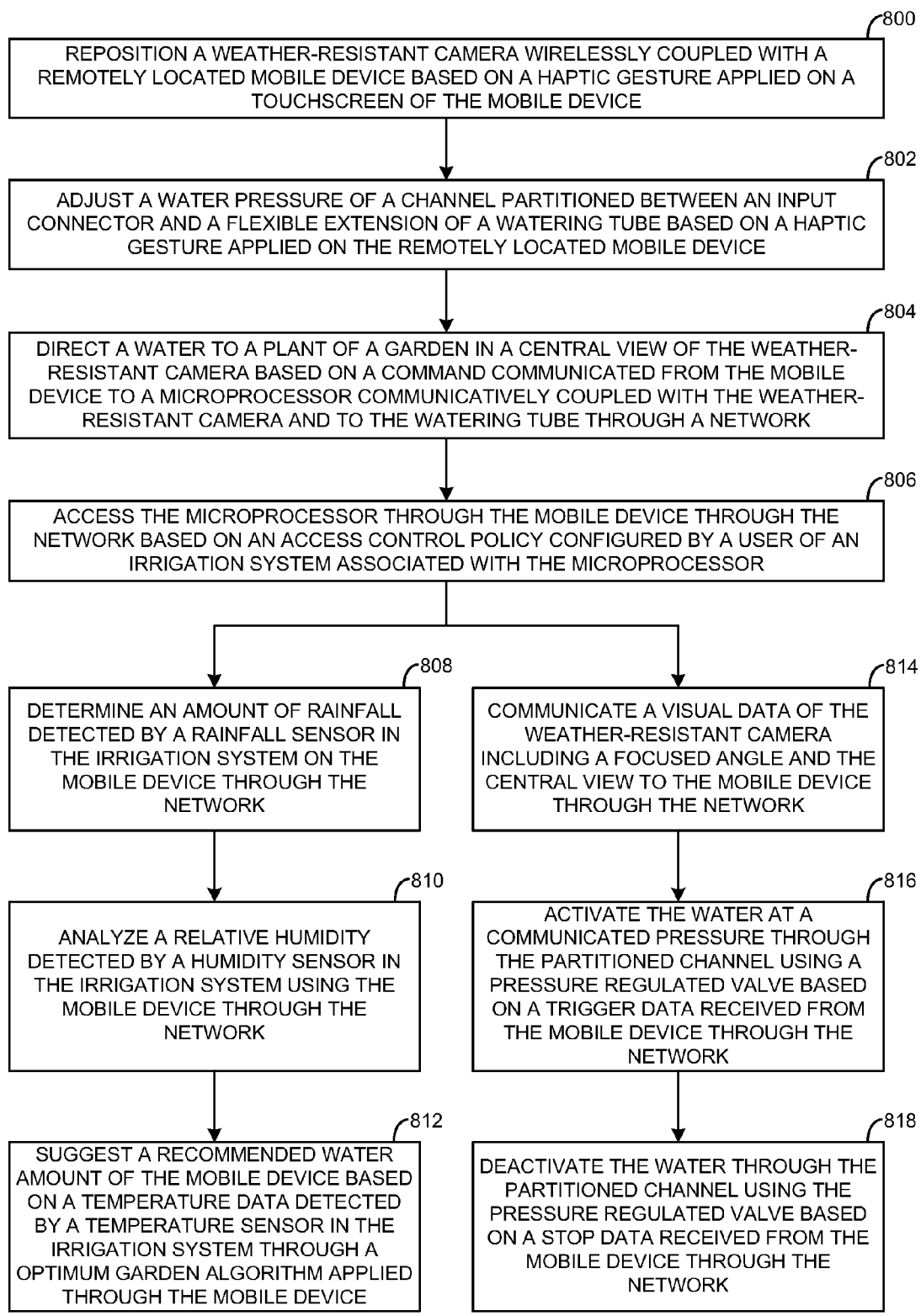
FIG. 8 is a flowchart illustrating various operations of the watering apparatus of FIG. 1 using the mobile device of FIG. 3, according to one or more embodiments.

In an alternate embodiment, a method for irrigation is described, as shown in FIG. 8. In operation 800, a weather resistant camera that is wirelessly coupled with a remotely located mobile device may be repositioned based on a haptic gesture applied on a touchscreen of the mobile device. In operation 802, a water pressure of a channel partitioned between an input connector and a flexible extension of a watering tube may be adjusted based on a haptic gesture applied on the remotely located mobile device. In operation 804, a water may be directed to a plant of a garden in a central view of the weather resistant camera based on a command communicated from the mobile device to a microprocessor communicatively coupled with the weather resistant camera and to the watering tube through the network. In operation 806, the microprocessor may be accessed through the mobile device based on an access control policy configured by a user of an irrigation system associated with the microprocessor. Then, the path may split. In operations 808, 810, 812, an amount of rainfall 614 may be detected by a rainfall sensor, a relative humidity 612 may be analyzed, and a watering amount may be recommended. Separately, in operations 814, 816, and 818, a visual data may be communicated to the watering apparatus, and water may be activated at a communicated pressure, and later water may be deactivated after use.

The user 308 may apply a haptic gesture to the touchscreen 314 of the mobile device 304. For example, a reposition data may be communicated to the weather resistant camera 106, and/or a message may be communicated such that a water pressure is adjusted. The user 308 may communicate a message to direct the water 402 to a plant 504 in a garden 500 in the central view 606 of the weather resistant camera 106. The user 308 may send a signal through the mobile device 304 through the Internet 306 using a near by cell tower 310. The Internet 306 may then send the signal to a LAN 300 that the communications circuitry 202 of the irrigation system 550 may be communicatively coupled to. Alternatively, the irrigation system 550 may send a signal to the mobile device 304 through the Internet 306 by using the communications circuitry communicatively coupled to the access point the LAN 300. The Internet 306 may then send the signal to the mobile device 304 through a cell tower 310. The mobile device 304 may determine an amount of rainfall 614, as determined by the rainfall sensor 208. The mobile device 304 may also determine a relative humidity 612 using the humidity sensor 204, in the irrigation system 550. The mobile device 304 may also suggest the water 402 amount. The mobile device 304 may do this by using information from the temperature sensor 206 in the irrigation system 550. The weather resistant camera 106 may send a visual data in the central view 606 to the mobile device 304, which may be displayed on the touchscreen 314. The mobile device 304 may be able to send a trigger data to the irrigation system 550 through the network. The mobile device 304 may also be able to send a stop data to the irrigation system 550.

Example embodiments of the watering apparatus 150 will now be described. A child, Arthi, age 7, might wish to water her garden when on vacation. Arthi may want to grow up and be a flower farmer. For this reason, Arthi may get up each day and water her garden. Arthi might miss watering her garden when her family is on vacation. Arthi and her father may build for her a 'Growinator' watering apparatus in their garage lab (a device name created by Arthi). This watering apparatus may allow Arthi to water her garden even when she is on vacation directly through her iPhone. As a result, her flower garden will continue thriving even when the family is away on vacation. In addition, Arthi may able to view her garden through the Watering Apparatus's camera to see progress. She may be able to guide the extension from the watering apparatus to an appropriate viewing location to enable safe watering of her garden directly to the roots of her garden. Arthi grows up and becomes an accomplished flower farmer and roboticist.

In another embodiment, a community group at the Portrero Hill community garden might wish to water their community garden. They may wish to take turns watering their garden. Members of the Portero Hill neighborhood may have signed up and verified their home addresses on the Nextdoor and Fatdoor social network. They may be able to collectively use the watering apparatus 150 when it is placed in a 'shared' mode in which trusted neighbors in the neighborhood users of the private neighborhood social network can share usage of the Growinator watering apparatus. A set of rules might automatically trigger reminders to neighbors when they need to water their community garden, and whose turn it is. The Growinator may automatically move itself to different parts of the community garden in the neighborhood garden so that each plant can be appropriately watered. As a result, the community garden may thrive.

The methods, systems, and apparatuses disclosed herein may be implemented in any means for achieving various embodiments, and may be executed in a form of a machine-readable medium embodying a set of instructions that, when executed by a machine, cause the machine to perform any of the operations disclosed herein. Although the present embodiments have been described with reference to specific example embodiments, it will be evident that various modifications and changes may be made to these embodiments without departing from the broader spirit and scope of the various embodiments.

For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and/or electrical circuits (e.g., Application Specific Integrated Circuitry (ASIC), Digital Signal Processor (DSP) circuitry, etc.). For example modules of each of the Figures may be enabled using electronic circuits using one or more of the technologies described herein.

In addition, it will be appreciated that the various operations, processes, and methods disclosed herein may be embodied in a machine-readable medium and or a machine accessible medium compatible with a data processing system (e.g., a computer system), and may be performed in any order. Accordingly, the specification and drawings are to be regarded in an illustrative rather than a restrictive sense.

What is claimed is:

1. A watering apparatus, comprising:
   a weather-resistant housing encompassing a micro-processor, a communications circuitry;

a weather-resistant camera communicatively coupled with the weather resistant housing through the communications circuitry;
an input connector to direct water through a channel partitioned from the weather resistant housing responsive to a signal from the microprocessor through a pressure regulated valve;
a flexible extension coupled with the weather-resistant housing to automatically transport the water directed through the channel partitioned to a desired location within a central view of a focused angle of the weather-resistant camera, and
a solar panel affixed on an upper surface of the watering apparatus to a power circuitry in the weather-resistant housing,
  wherein a privacy server communicatively coupled with the watering apparatus through a network to apply an address verification algorithm associated with each user of an online community formed using the privacy server to verify that each user lives at a residence associated with a claimable residential address of the online community formed through a social community module of the privacy server using a processor and a memory of the privacy server,
  wherein the privacy server to generate a latitudinal data and a longitudinal data associated with each claimable residential address of the online community associated with each user of the online community,
  wherein the privacy server to automatically determine a set of access privileges in the online community associated with each user of the online community by constraining access in the online community based on a neighborhood boundary determined using a Bezier curve algorithm of the privacy server,
  wherein the watering apparatus to be constrained in accessibility only to those neighbors that are verified to live in the neighborhood boundary in which the watering apparatus is located,
  wherein the watering apparatus to function as a community resource in the online community such that neighbors verified as living inside the neighborhood boundaries and which are part of a gardening club of the online community can collectively take turns using the watering apparatus to water a community garden of the online community, and
  wherein the watering apparatus wirelessly registers a public and private Internet Protocol (IP) address with a local access point of the network through the communications circuitry.

2. The watering apparatus of claim 1 wherein the watering apparatus is accessed through a mobile device through the network based on an access control policy configured by a user of the watering apparatus.

3. The watering apparatus of claim 2 wherein the watering apparatus communicates a visual data of the weather-resistant camera including the focused angle and the central view to the mobile device through the network, and wherein the weather-resistant camera repositions based on a reposition data received from the mobile device through the network when a haptic gesture is applied on a touchscreen of the mobile device.

4. The watering apparatus of claim 3:
wherein the watering apparatus to activate the water at a communicated pressure through the channel partitioned using the pressure regulated valve based on a trigger data received from the mobile device through the network, and
wherein the watering apparatus to deactivate the water through the channel partitioned using the pressure regulated valve based on a stop data received from the mobile device through the network.

5. The watering apparatus of claim 1 further comprising:
a rainfall sensor in the weather-resistant housing of the watering apparatus to communicate an amount of rainfall detected by the watering apparatus to the mobile device through the network;
a humidity sensor in the weather-resistant housing of the watering apparatus to communicate a relative humidity detected by the watering apparatus to the mobile device through the network; and
a temperature sensor in the weather-resistant housing of the watering apparatus to communicate a temperature data to the mobile device through the network.

6. An irrigation system, comprising:
a weather-resistant housing encompassing a micro-processor, a communications circuitry;
a weather-resistant camera communicatively coupled with the weather resistant housing through the communications circuitry;
a mobile device to reposition the weather-resistant camera and to direct water to a plant of a garden in a central view of the weather-resistant camera based on commands communicated from the mobile device to the microprocessor through a network;
an input connector to direct the water through a channel partitioned from the weather resistant housing responsive to a signal from the microprocessor through a pressure regulated valve; and
a flexible extension coupled with the weather-resistant housing to automatically transport the water directed through the channel partitioned to a desired location within the central view of a focused angle of the weather-resistant camera,
  wherein a watering apparatus wirelessly registers a public and private Internet Protocol (IP) address with a local access point of the network through the communications circuitry,
  wherein the watering apparatus is accessed through the mobile device through the network based on an access control policy configured by a user of the watering apparatus,
  wherein the watering apparatus communicates a visual data of the weather-resistant camera including the focused angle and the central view to mobile device through the network, and wherein the weather-resistant camera repositions based on a reposition data received from the mobile device through the network when a haptic gesture is applied on a touchscreen of the mobile device,
  wherein the watering apparatus to activate the water at a communicated pressure through the channel partitioned using the pressure regulated valve based on a trigger data received from the mobile device through the network,
  wherein the watering apparatus to deactivate the water through the channel partitioned using the pressure regulated valve based on a stop data received from the mobile device through the network,
  wherein a privacy server communicatively coupled with the watering apparatus through a network of the irrigation system to apply an address verification algorithm associated with each user of an online community formed using the privacy server to verify that each user lives at a residence associated with a claimable residential address of the online community formed through a social community module of the privacy server using a processor and a memory of the privacy server, wherein the privacy server to generate a latitudinal data and a longitudinal data associated with each claimable residential address of the online community associated with each user of the online community, wherein the privacy server to automatically determine a set of access privileges in the online community associated with each user of the online community by constraining access in the online community based on a neighborhood boundary determined using a Bezier curve algorithm of the privacy server, wherein the watering apparatus to be constrained in accessibility only to those neighbors that are verified to live in the neighborhood boundary in which the watering apparatus is located, and wherein the watering apparatus to function as a community resource in the online community such that neighbors verified as living inside the neighborhood boundaries and which are part of a gardening club of the online community can collectively take turns using the watering apparatus to water a community garden of the online community.

7. The irrigation system of claim 6 further comprising:

a rainfall sensor associated with the weather-resistant housing of the watering apparatus to communicate an amount of rainfall detected by the watering apparatus to the mobile device through the network;

a humidity sensor associated with the weather-resistant housing of the watering apparatus to communicate a relative humidity detected by the watering apparatus to the mobile device through the network; and a temperature sensor associated with the weather-resistant housing of the watering apparatus to communicate a temperature data to the mobile device through the network.

8. The irrigation system of claim 6 further comprising:

a solar panel affixed on an upper surface of the watering apparatus to a power circuitry in the weather-resistant housing.

9. An irrigation method, comprising:

repositioning a weather-resistant camera wirelessly coupled with a remotely located mobile device based on a haptic gesture applied on a touchscreen of the mobile device;

adjusting a water pressure of a channel partitioned between an input connector and a flexible extension of a watering tube based on the haptic gesture applied on the remotely located mobile device;

directing water to a plant of a garden in a central view of the weather-resistant camera based on a command communicated from the mobile device to a microprocessor communicatively coupled with the weather-resistant camera and to the watering tube through a network;

determining an amount of rainfall detected by a rainfall sensor in an irrigation system on the mobile device through the network;

analyzing a relative humidity detected by a humidity sensor in the irrigation system using the mobile device through the network;

accessing the microprocessor through the mobile device through the network based on an access control policy configured by a user of the irrigation system associated with the microprocessor; and suggesting a recommended water amount on the mobile device based on a temperature data detected by a temperature sensor in the irrigation system through an optimum garden algorithm applied through the mobile device, wherein the microprocessor and the weather-resistant camera is powered through a solar panel affixed to the weather resistant camera, wherein the microprocessor, the rainfall sensor, the humidity sensor, and the temperature sensor are embedded in a weather-resistant housing of the weather-resistant camera, wherein a privacy server communicatively coupled with a watering apparatus through the network to apply an address verification algorithm associated with each user of an online community formed using the privacy server to verify that each user lives at a residence associated with a claimable residential address of the online community formed through a social community module of the privacy server using a processor and a memory, wherein the privacy server to generate a latitudinal data and a longitudinal data associated with each claimable residential address of the online community associated with each user of the online community, wherein the privacy server to automatically determine a set of access privileges in the online community associated with each user of the online community by constraining access in the online community based on a neighborhood boundary determined using a Bezier curve algorithm of the privacy server, wherein the watering apparatus to be constrained in accessibility only to those neighbors that are verified to live in a neighborhood boundary in which the watering apparatus is located, and wherein the watering apparatus to function as a community resource in the online community such that neighbors verified as living inside the neighborhood boundaries and which are part of a gardening club of the online community can collectively take turns using the watering apparatus to water a community garden of the online community.

10. The irrigation method of claim 9 wherein the microprocessor communicates a visual data of the weather-resistant camera including a focused angle and the central view to the mobile device through the network.

11. The irrigation method of claim 10:

wherein the microprocessor to activate the water at a communicated pressure through the channel partitioned using a pressure regulated valve based on a trigger data received from the mobile device through the network, and wherein the microprocessor to deactivate the water through the channel partitioned using the pressure regulated valve based on a stop data received from the mobile device through the network.

* * * * *